US008762460B2

(12) United States Patent
Lindner et al.

(10) Patent No.: US 8,762,460 B2
(45) Date of Patent: Jun. 24, 2014

(54) GROUP COMMUNICATION SESSIONS BETWEEN SESSION PARTICIPANTS COMMUNICATING VIA TWO OR MORE DIFFERENT CONTACT PROTOCOLS WITHIN A WIRELESS COMMUNICATIONS SYSTEM

(75) Inventors: Mark A. Lindner, Superior, CO (US); Shilpa Velamuri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 12/818,833

(22) Filed: Jun. 18, 2010

(65) Prior Publication Data

US 2011/0153743 A1 Jun. 23, 2011

Related U.S. Application Data

(60) Provisional application No. 61/225,129, filed on Jul. 13, 2009.

(51) Int. Cl.
*G06F 15/16* (2006.01)

(52) U.S. Cl.
USPC .......................................................... 709/204

(58) Field of Classification Search
USPC .......................................................... 709/206
See application file for complete search history.

(56) References Cited

U.S. PATENT DOCUMENTS

| | | | | |
|---|---|---|---|---|
| 5,778,189 A | * | 7/1998 | Kimura et al. ................. | 709/236 |
| 5,999,979 A | * | 12/1999 | Vellanki et al. ............... | 709/232 |
| 6,473,793 B1 | * | 10/2002 | Dillon et al. .................. | 709/223 |
| 7,164,690 B2 | * | 1/2007 | Limb et al. .................... | 370/443 |
| 7,408,906 B2 | * | 8/2008 | Griswold et al. ............. | 370/338 |
| 7,599,999 B1 | * | 10/2009 | Armstrong et al. ........... | 709/216 |
| 7,701,970 B2 | * | 4/2010 | Krits et al. .................... | 370/466 |
| 7,720,090 B2 | * | 5/2010 | Limb et al. .................... | 370/443 |
| 7,724,710 B2 | * | 5/2010 | Limb et al. .................... | 370/337 |
| 7,724,763 B2 | * | 5/2010 | Limb et al. .................... | 370/443 |
| 7,739,398 B1 | * | 6/2010 | Shabtay ........................ | 709/232 |

(Continued)

FOREIGN PATENT DOCUMENTS

| | | |
|---|---|---|
| WO | WO2007149526 | 12/2007 |
| WO | WO2008094412 | 8/2008 |
| WO | WO2010012988 | 2/2010 |

OTHER PUBLICATIONS

International Search Report and Written Opinion—PCT/US2010/041875, International Search Authority—European Patent Office—Oct. 11, 2010.

*Primary Examiner* — Brian P Whipple
(74) *Attorney, Agent, or Firm* — Raphael Freiwirth

(57) ABSTRACT

In an embodiment, an access terminal (AT) obtains media intended for transmission to a communication group during a group communication session (GCS). The communication group includes a first set of ATs configured to exchange media via a primary communication protocol (PCP) mediated by an application server (AS) and a second set of ATs configured to exchanged media via a secondary communication protocol (SCP). The AT selectively transmits the obtained media in accordance with the PCP and/or the SCP to facilitate both the first and second sets of ATs to receive the media. In an embodiment, the AS sends instructions to a given AT among the first set associated with whether the given AT is responsible for extending support of the GCS to at least one of a second set of ATs via the SCP. In another embodiment, the AS itself selectively transmits media to the communication group via the SCP.

51 Claims, 18 Drawing Sheets

(56) References Cited

U.S. PATENT DOCUMENTS

| | | | |
|---|---|---|---|
| 2001/0030975 A1* | 10/2001 | Limb et al. | 370/465 |
| 2001/0034782 A1* | 10/2001 | Kinkade | 709/219 |
| 2002/0165975 A1* | 11/2002 | Abbott | 709/230 |
| 2005/0041686 A1* | 2/2005 | Roy et al. | 370/466 |
| 2005/0138190 A1* | 6/2005 | Connor | 709/230 |
| 2006/0224750 A1* | 10/2006 | Davies et al. | 709/229 |
| 2007/0076717 A1* | 4/2007 | Limb et al. | 370/390 |
| 2007/0233901 A1* | 10/2007 | Kuan et al. | 709/246 |
| 2007/0242687 A1* | 10/2007 | Limb et al. | 370/443 |
| 2007/0242692 A1* | 10/2007 | Limb et al. | 370/465 |
| 2008/0281931 A1* | 11/2008 | Oh et al. | 709/206 |
| 2010/0284420 A1* | 11/2010 | Limb et al. | 370/443 |
| 2011/0016230 A1* | 1/2011 | Cardno et al. | 709/246 |
| 2013/0297693 A1* | 11/2013 | Miller et al. | 709/204 |

\* cited by examiner

GROUP COMMUNICATION SESSIONS BETWEEN SESSION PARTICIPANTS COMMUNICATING VIA TWO OR MORE DIFFERENT CONTACT PROTOCOLS WITHIN A WIRELESS COMMUNICATIONS SYSTEM

The present Application for Patent claims priority to Provisional Application No. 61/225,129, entitled "GROUP COMMUNICATION SESSIONS BETWEEN SESSION PARTICIPANTS COMMUNICATING VIA TWO OR MORE DIFFERENT CONTACT PROTOCOLS WITHIN A WIRELESS COMMUNICATIONS SYSTEM", filed Jul. 13, 2009, assigned to the assignee hereof and hereby expressly incorporated by reference herein in its entirety.

BACKGROUND OF THE INVENTION

1. Field of the Invention

Embodiments of the present invention are directed to group communication sessions between session participants communicating via two or more different contact protocols within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, an access terminal (AT) obtains media intended for transmission to a communication group during a group communication session. The communication group includes a first set of ATs configured to exchange media via a primary communication protocol mediated by an application server and a second set of ATs configured to exchanged media via a secondary communication protocol. The AT selectively transmits the obtained media in accordance with the primary communication protocol and/or the secondary communication protocol to facilitate both the first and second sets of ATs to receive the media. In an embodiment, the application server sends instructions to a given AT among the first set associated with whether the given AT is responsible for extending support of the group communication session to at least one of a second set of ATs via the secondary communication protocol. In another embodiment, the application server itself selectively transmits media to the communication group via the secondary communication protocol.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
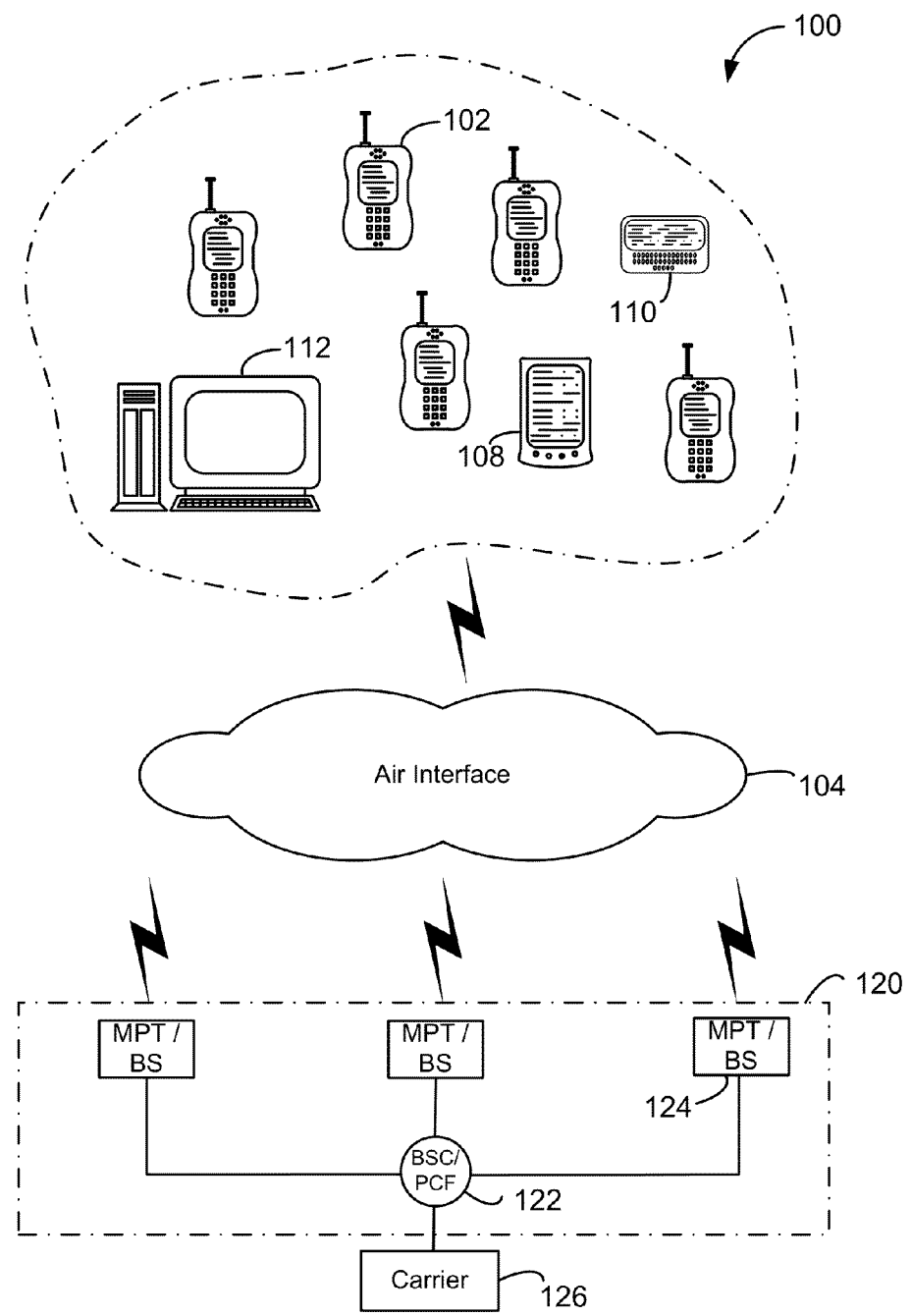
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data serving node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
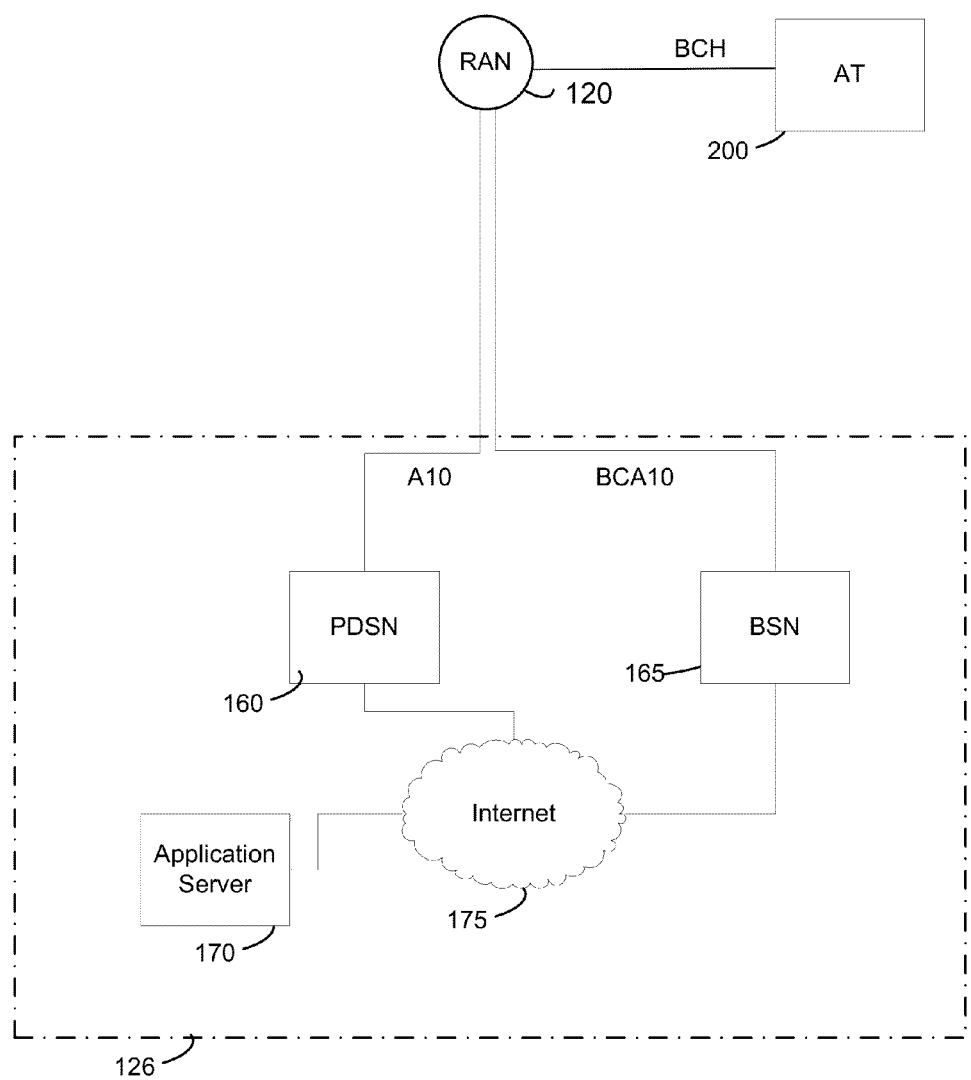
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
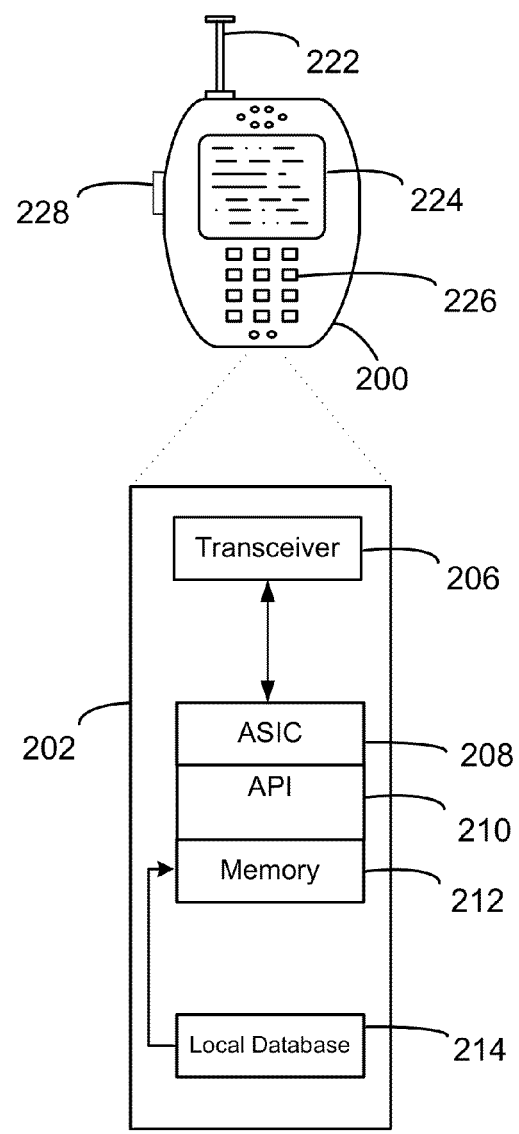
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 200 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 200, MPT/BS 124, and BSC/PCF 122. The BSC/PCF 122 can be connected to multiple data networks such as the carrier network 126, PSTN, the Internet, a virtual private network, and the like, thus allowing the access terminal 200 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

In conventional wireless communication systems, group communication sessions can be arbitrated by a network of servers (e.g., collectively corresponding to the application server 170) that are distributed through the system and connected to the RAN 120. The subscribers to a particular group communication service (e.g., a push-to-talk (PTT) service, a push-to-transfer (PTX) service, etc.) are thereby permitted to communicate with other subscribers of the same service with messages being exchanged either through, or at the control of, the application server 170. In the case of a group audio session, this means audio packets can be transmitted to the application server 170 via the RAN 120 from one of the subscribers, and the application server 170 can then forward the audio packets to one or more other subscribers actively participating in the group communication session. Likewise, for group sessions involving other types of media (e.g., text messages, multimedia messages including video and/or audio, etc.), other types of data packets can be exchanged between group members, or subscribers, during the session.

One of the reasons these group communication sessions are arbitrated by the application server 170 is that the individual subscribers do not necessarily have easy access to complete membership lists for a particular group. For example, individual subscribers cannot be expected to track which other subscribers are current with their membership fees, which other subscribers have de-registered from the group, etc. Accordingly, one of the responsibilities of the application server 170 is tracking group memberships. Thus, when the application server 170 receives a request to initiate a group communication session, the application server 170 loads the current group's membership and uses this information to contact the session targets for the session.

Also, the application server 170 is typically configured to facilitate group communication sessions via a particular group communication service that is available to subscribers of the service. Conventionally, the application server 170 does not join non-subscribing ATs and/or subscribers that cannot currently communicate via the group communication service to the session (e.g., offline subscribing ATs). In the case of non-subscribing ATs, these access terminals do not necessarily have the requisite permission, software and/or hardware to participate via the protocols used by the group communication service. For example, if the group communication service is a server-arbitrated group-text service, subscribers may have special software loaded onto their communication devices which is not necessarily available to non-subscribers, which precludes the non-subscribers from participating in group-text sessions supported by the service. In the case of offline subscribing ATs, if the subscribing ATs are offline or not logged into the application server 170, the application server 170 may either not be aware of how to contact the offline subscribing ATs, or the offline subscribing ATs will simply ignore messaging received via the protocol for the group communication service (e.g., at least until the offline subscribing AT later logs into the server). In an example, certain subscribing ATs may be considered to be offline if a primary communication protocol used by the application server 170 cannot currently be supported by the subscribing ATs (e.g., such as when the primary communication protocol corresponds to EV-DO and the subscribing ATs are in locations where EV-DO is not supported).

Accordingly, it will be appreciated that conventional server-arbitrated group communication sessions are typically conducted between subscribers to the associated group communication service that are currently online or logged into the application server 170 configured to support the group communication sessions. An example of how a conventional server-arbitrated communication session can be setup is described with respect to FIG. 4.

Figure 4:
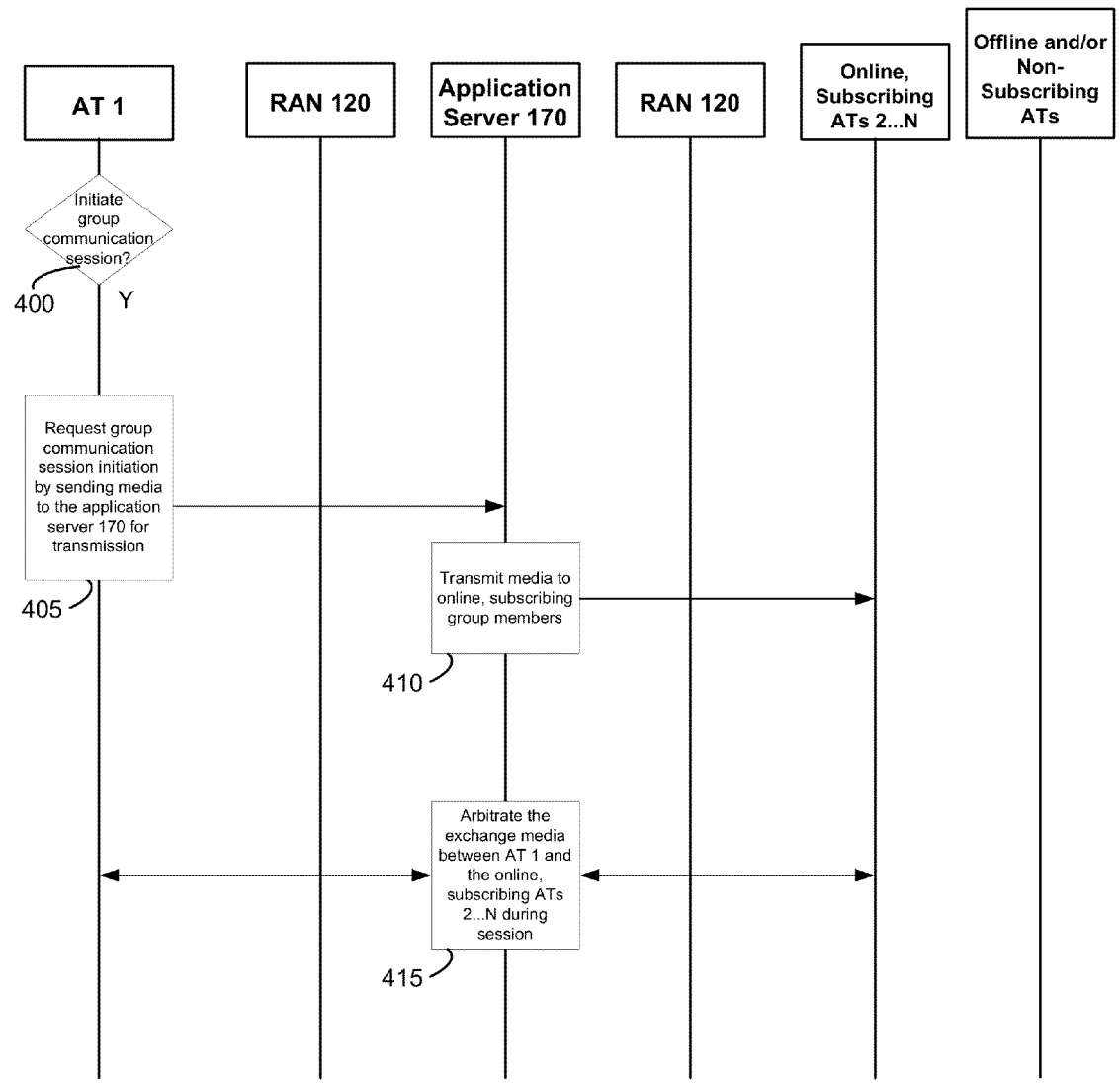
FIG. 4 illustrates a conventional process of setting up a server-arbitrated group communication session initiated by an originating access terminal (AT).

With respect to FIG. 4, a given AT ("AT 1") determines whether to initiate a group communication session, 400. Assume that AT 1 determines to initiate a group communication session in accordance with a given communication protocol or service (e.g., a group-text service) to be arbitrated by the application server 170, that the user of AT 1 is an online subscriber to the service (i.e., the user of AT 1 has sufficient privileges to initiate the session) and that the user of AT 1 desires to contact a group of ATs that includes online subscribers, offline subscribers and non-subscribing ATs (e.g., although, at this point, AT 1 does not necessarily know that certain desired contacts are offline, online or non-subscribing).

Accordingly, in 405, AT 1 sends a group communication session initiation request to the RAN 120, which is then forwarded to the application server 170. In an example, if the group communication session corresponds to a group-text and/or group multimedia session, the group communication session initiation request can be sent along with initial media to be forwarded to the other group members. Alternatively, the initial media may be sent after the group communication session initiation request is sent. The application server 170 receives the group communication session initiation request, locates the current online subscribers ("ATs 2 ... N") belonging to the associated group, and then transmits the media to the current online subscribers, 410, as is known in the art. The application server 170 then arbitrates the exchange of media between AT 1 and each of ATs 2 ... N during the communication session, 415.

As shown in FIG. 4, any offline subscribers and/or non-subscribing ATs do not actually receive the media from AT 1, and do not thereafter participate in the group communication session (e.g., in the case of the offline subscribers, a notification may eventually be received by these ATs during a subsequent log-in but they will have missed their opportunity to actively participate in the session). Accordingly, embodiments of the invention are directed to extending or expanding the types of ATs that can participate in server-arbitrated group communication sessions to include ATs that cannot participate in the session via the primary service type.

In embodiments described with respect to FIGS. 5A through 6D, one or more group-members are responsible for forwarding or re-transmitting group messages to ATs that cannot participate in the session via the primary service type ("primary communication protocol"). The primary communication protocol generally refers to a proprietary protocol specific to the group communication service supported by the application server 170 (e.g., Yagatta). Thus, in these embodiments, few changes need be implemented at the application server 170, which can exchange media between online subscribing ATs as in FIG. 4 (e.g., although notifications related to group membership, such as which subscribers are offline or online, can be sent to the online subscribing ATs in the embodiments below), while leaving media exchanges between non-subscribing ATs and/or offline subscribing ATs to handset-level enforcement. In embodiments described with respect to FIGS. 7A through 7E, the application server 170 is responsible for arbitrating the group communication session between both online subscribing ATs and either offline subscribing ATs or non-subscribing ATs. In this case, the application server 170 communicates with the online subscribing ATs via the primary communication protocol (e.g., a proprietary protocol specific to the group communication service supported by the application server 170, such as Yagatta), and communicates with the offline subscribing ATs and/or non-subscribing ATs via a secondary or alternate contact protocol (e.g., text or SMS messaging, multimedia or MMS messaging, etc.). Both the handset and/or server implemented embodiments thereby permit offline and/or non-subscribing ATs to a particular group communication service to participate in group communication sessions related to the service via alternate contact protocol(s).

Figure 5A:
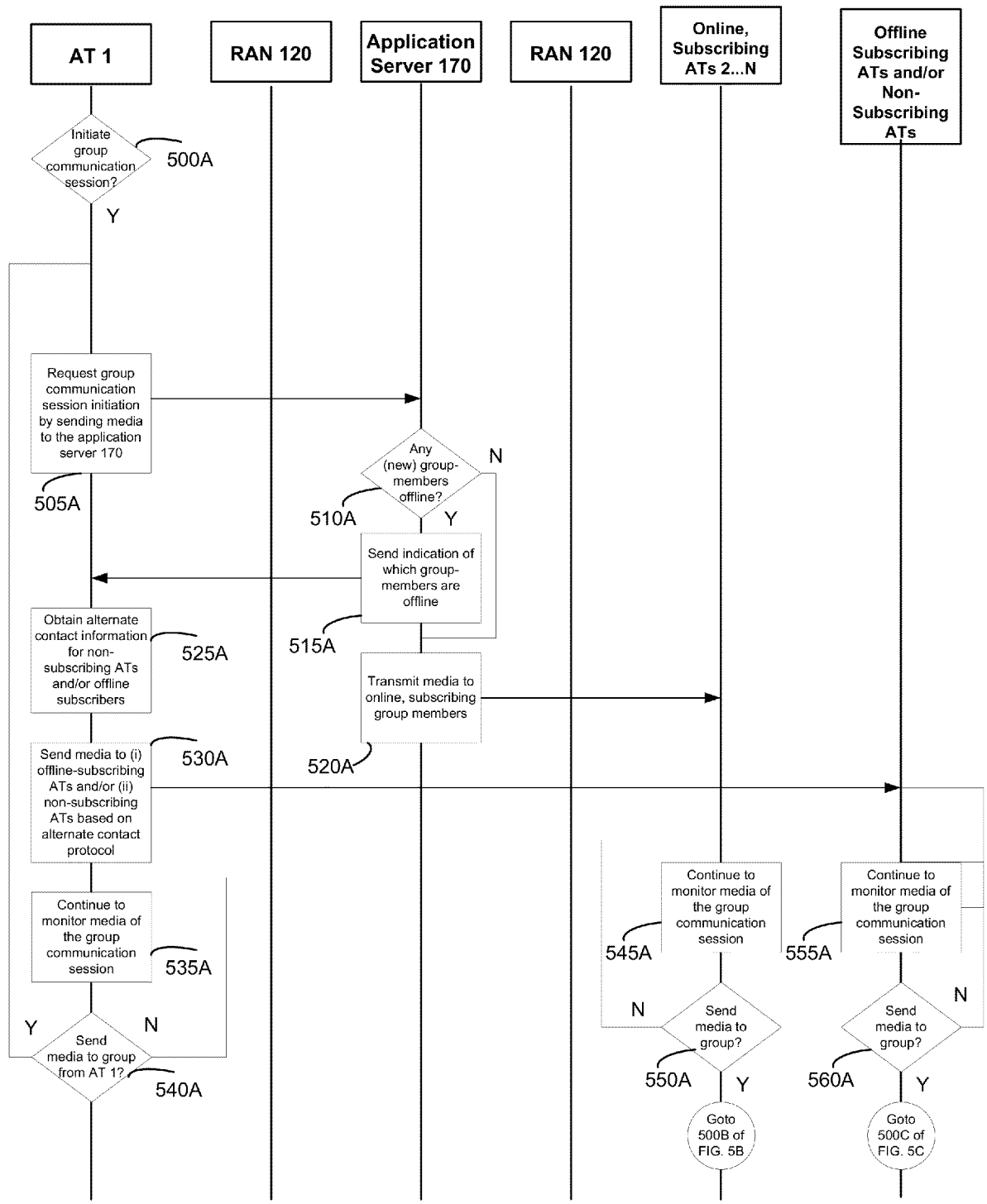
FIG. 5A illustrates a process of setting up a server-arbitrated group communication session initiated by an originating AT in accordance with an embodiment of the invention.

FIG. 5A illustrates a process of setting up a server-arbitrated group communication session initiated by an originating AT ("AT 1") in accordance to an embodiment of the invention. Referring to FIG. 5A, AT 1 determines whether to initiate a group communication session, 500A. Assume that AT 1 determines to initiate a group communication session to be at least partially arbitrated by the application server 170, that the user of AT 1 is an online subscriber to the service (i.e., the user of AT 1 has sufficient privileges to initiate the session) and that the user of AT 1 desires to contact a group of ATs that includes online subscribers, offline subscribers and non-subscribing ATs. It may further be assumed that AT 1 has alternate contact information (e.g., a phone number, an email address, etc.) for at least some of its intended call targets, such that AT 1 can establish a separate connection to its intended call targets in the event that these call targets cannot be reached by the application server 170. AT 1 also has its own alternate contact information from which AT 1 can be contacted over a separate connection than the group session protocol, which can be referred to as an alternate contact protocol (e.g., SMS message, MMS messaging, etc.).

Accordingly, in 505A, AT 1 sends a group communication session initiation request to the RAN 120, which is then forwarded to the application server 170. In an example, if the group communication session corresponds to a group-text and/or group multimedia session, the group communication session initiation request can be sent along with initial media (e.g., an initial text message, an initial multimedia message including video and/or audio, etc.) to be forwarded to the other group members. The application server 170 receives the group communication session initiation request, locates the current online subscribers ("ATs 2 ... N") belonging to the associated group, and determines if any of the group-members associated with the session request are offline, or not currently logged into the application server 170, 510A.

If the application server 170 determines that each group-member is currently online, then the process advances directly to 520A, and the application server 170 transmits the media to the current online subscribers. However, if the application server 170 determines that one or more group-members is offline, then the application server 170 sends an indication of which group-members are currently offline to AT 1, 515A, and then advances to 520A where the application server 170 sends the media to any online subscribing group members (i.e., ATs 2 ... N). Alternatively, AT 1 may be provisioned with a 'presence' feature through which AT 1 can keep itself informed of which other subscribing ATs are currently online. In this case, it will be appreciated that the decision block 510A and the notification of 515A need not be sent because AT 1 can obtain information with regard to which subscribing ATs are offline via the presence feature.

Referring to FIG. 5A, AT 1 receives the indication of the offline subscribing ATs, and then obtains alternate contact information for (i) any offline subscribing ATs indicated in the message from 515A, and/or (ii) any non-subscribing ATs. In this example, the non-subscribing ATs are known to AT 1 before the session request message is sent in 505A, and the application server 170 need not be aware of their presence and/or inclusion within the group session. In other words, the user of AT 1 can select additional contacts (e.g., from an address book thereon) to add to the group session, in which case the alternate contact information can correspond to contact information (e.g., a phone number, an email address, etc.) stored in association with the selected additional contacts on AT 1 (e.g., alternatively, the contact information need not be stored on AT 1, but rather can be manually entered by the user of AT 1). Thus, for the non-subscribing ATs, the alternate contact information can obtained from user input and/or from information stored on AT 1, in an example (e.g., although this information could also be retrieved from a network server and then downloaded to AT 1).

With regard to the offline subscribing ATs, the alternate contact information can be received along with the indication of their offline status from the application server 170 in 515A. As will be appreciated, this assumes that the application server 170 maintains alternate contact information of at least some of its subscribers, which is not necessarily the case in each embodiment of this invention and/or for each subscriber. Alternatively, the indication of the non-subscribing ATs in 515A can be used to identify the ATs but not to indicate their alternate contact information, such that AT 1 can then obtain the alternate contact information by mapping the identified offline subscribing ATs to information stored or obtainable by AT 1 (e.g., by associating an offline subscribing AT to a corresponding phone number or email address in AT 1's address book, etc.).

After obtaining the alternate contact information for each non-subscribing AT and/or each offline subscribing AT in 525A, AT 1 sends the media (e.g., the same media that was sent to the online subscribing ATs by the application server 170 in 520A) to each non-subscribing AT and/or each offline subscribing AT that AT 1 is attempting to include in the group communication session via one or more alternate contact protocols, 530A. For example, if the alternate contact information for a particular AT corresponds to a phone number, and the media is string or textual information, then the alternate contact protocol for that particular AT may correspond to a text message protocol or short message service (SMS) protocol. In a further example, if the alternate contact information for a particular AT corresponds to a phone number, and the media is more advanced (e.g., an image, audio, video and/or rich text multimedia object), then the alternate contact protocol for that particular AT may correspond to a multimedia messaging service (MMS) protocol. In a further example, if the alternate contact information for a particular AT corresponds to an email address, then the alternate contact protocol for that particular AT corresponds to an email protocol (e.g., which can include the media as an email attachment, in a subject or body section of the email, etc.). It will be appreciated that not all of the non-subscribing ATs and/or each offline subscribing ATs need have their alternate contact information conform to the same alternate contact protocol (e.g., some of these ATs may wish to be contacted via email, while other ATs may wish to be contacted via SMS messaging, etc.).

After the initial media from AT 1 is sent to each group member (e.g., to each online subscribing AT in 520A and to each offline subscribing AT and/or non-subscribing AT in 530A), AT 1 monitors subsequent media exchanged during the communication session, 535A. In 540A, AT 1 determines whether the user of AT 1 has media to send to the group. If the user of AT 1 does not have media to send to the group, the process returns to 535A and AT 1 waits to receive media from other group members and/or for a request from AT 1 to send media to the group. Otherwise, if the user of AT 1 wishes to send additional media to the group in 540A, the process returns to 505A where AT 1 sends additional media to the application server 170 for transmission to the online subscribing ATs 2 . . . N via the primary communication protocol, and also sends media to the non-subscribing ATs and/or the offline subscribing ATs via the alternate contact protocol(s) in 530A. It will be appreciated that the application server 170 need not send another indication of the offline subscribing ATs in 515A unless the information has changed (e.g., a previously online subscribing AT is now offline, a previously offline subscribing AT is now online, etc.), which can occur at any point during the group communication session.

Each online subscribing AT monitors media associated with the group communication session that is received over the primary communication protocol, 545A. In 550A, each online subscribing AT determines whether to send media to send to the group. Online subscribing ATs that determine not to send media to the group return to 545A and continue to monitor media associated with the group communication session. Online subscribing ATs that determine to send media to the group advance to 500B of FIG. 5B. Similarly, each offline subscribing AT and/or non-subscribing AT monitors media associated with the group communication session that is received over its respective alternate contact protocol, 555A. In 560A, each offline subscribing AT and/or non-subscribing AT determines whether to send media to send to the group. Offline subscribing ATs and/or non-subscribing ATs that determine not to send media to the group return to 555A and continue to monitor media associated with the group communication session via their respective alternate contact protocol(s). Offline subscribing ATs and/or non-subscribing ATs that determine to send media to the group advance to 500C of FIG. 5C.

Figure 5B:
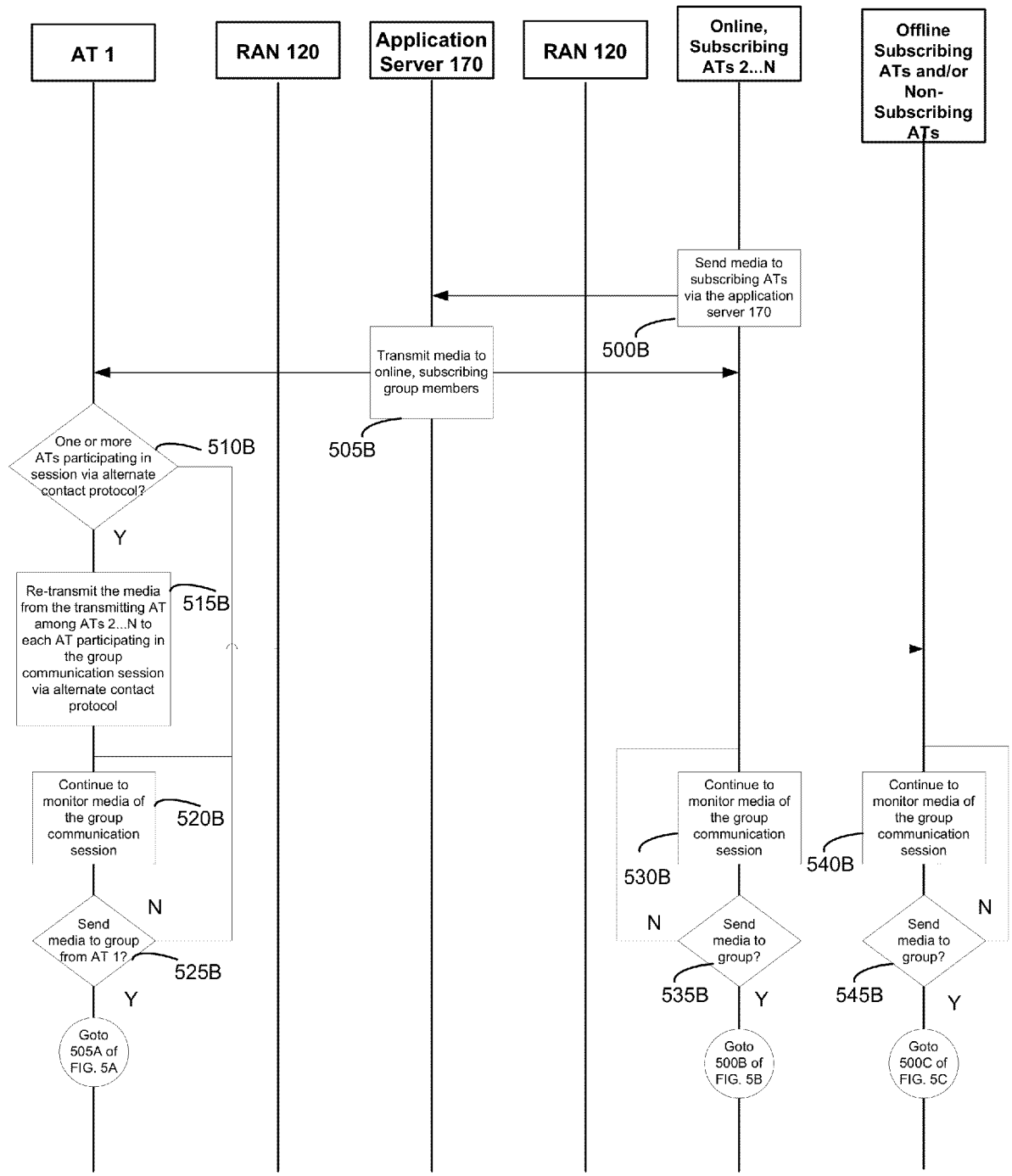
FIG. 5B illustrates a continuation of the process of FIG. 5A in accordance to an embodiment of the invention.

Referring to FIG. 5B, assume that one of the online subscribing ATs 2 . . . N has determined to send media to the group. Accordingly, the online subscribing AT sends media to the RAN 120, which is then forwarded to the application server 170, 500B, via the primary communication protocol. The application server 170 receives the media from the online subscribing AT, and then transmits the media to each other online subscribing AT, including AT 1, 505B, via the primary communication protocol. AT 1 receives the media from 505B via the primary communication protocol, and then determines whether one or more ATs are participating in the group communication session via one or more alternate contact protocols, 510B. In other words, if any offline subscribing ATs and/or non-subscribing ATs are included in the group, then at least one of the group participants is participating via an alternate contact protocol. If only online subscribing ATs are participating in the group communication session the process can advance directly to 520B. In this example, it may be assumed that at least one non-subscribing AT and/or offline subscribing AT is present in the group. Accordingly, AT 1 re-transmits the media, which was received in 505B via the primary communication protocol, to each non-subscribing AT and/or offline subscribing AT participating in the group communication session via their respective alternate contact protocol(s), 515B.

In an example, assume that the group communication session is a group-text session, that the online subscribing ATs are communicating via a proprietary group session protocol for the text session and that each non-subscribing AT and/or offline subscribing AT is participating via SMS messaging. Thus, in this example, the media in 505B is received at AT 1 via proprietary group session protocol messaging, and the media in 515B is sent to each non-subscribing AT and/or offline subscribing AT via one or more SMS messages.

After re-transmitting the media in 515B, 520B through 545B generally correspond to 535A through 560A of FIG. 5A, respectively, and as such will not be discussed further for the sake of brevity.

Figure 5C:
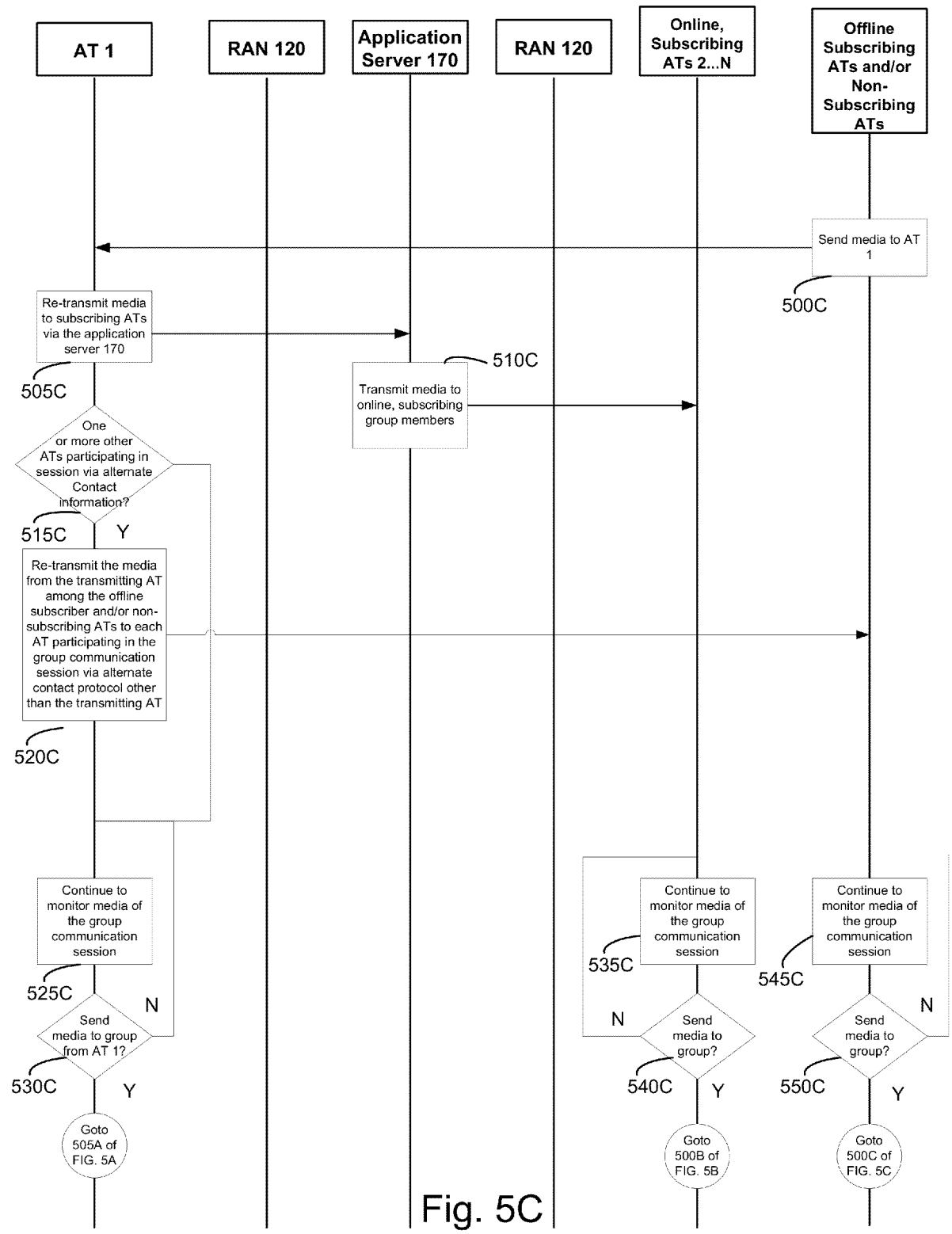
FIG. 5C illustrates another continuation of the process of FIG. 5A in accordance to an embodiment of the invention.

Referring to FIG. 5C, assume that one of the offline subscribing ATs and/or one of the non-subscribing ATs has determined to send media to the group. Accordingly, the offline subscribing AT or non-subscribing AT sends media to the RAN 120, which forwards the media to AT 1 via the alternate contact protocol, 500C. For example, if the alternate contact protocol is SMS messaging, then a target address for the SMS message of 500C corresponds to AT 1's own phone number. In an example, the target address in 500C may be included as a source address for the SMS message in 530A of FIG. 5A, in example.

AT 1 receives the media from 500C via the alternate contact protocol, and then re-transmits the media to the application server 170 via the RAN 120 over the primary communication protocol, 505C, and the application server 170 transmits the media over the primary communication protocol to each other online subscribing AT, 510C.

Also, in 515C, then determines whether one or more ATs, other than the transmitting AT from 500C, are participating in the group communication session via one or more alternate contact protocols, 515C. In other words, if any offline subscribing ATs and/or non-subscribing ATs, other than the transmitting AT from 500C, are included in the group, then at least one other group participant is participating via an alternate contact protocol. If no other non-subscribing ATs or offline subscribing ATs are participating in the group communication session the process can advance directly to 525C. In this example, it may be assumed that at least one non-subscribing AT and/or offline subscribing AT, other than the transmitting AT from 500C, is present in the group. Accordingly, AT 1 re-transmits the media, which was received in 505C via the alternate contact protocol from the transmitting AT, to each non-subscribing AT and/or offline subscribing AT, other than the transmitting AT from 500C, that is participating in the group communication session via their respective alternate contact protocol(s), 520C.

In an example, assume that the group communication session is a group-text session, that the online subscribing ATs are communicating via a proprietary group session protocol for the text session and that each non-subscribing AT and/or offline subscribing AT is participating via SMS messaging. Thus, in this example, the media in 500C is received at AT 1 via SMS messaging, the media re-transmitted in 505C by AT 1 is sent via proprietary group session protocol messaging, and the media re-transmitted by AT 1 in 520C is sent via SMS messaging.

After re-transmitting the media in 520C, 525C through 550C generally correspond to 535A through 560A of FIG. 5A, respectively, and as such will not be discussed further for the sake of brevity.

Figure 5D:
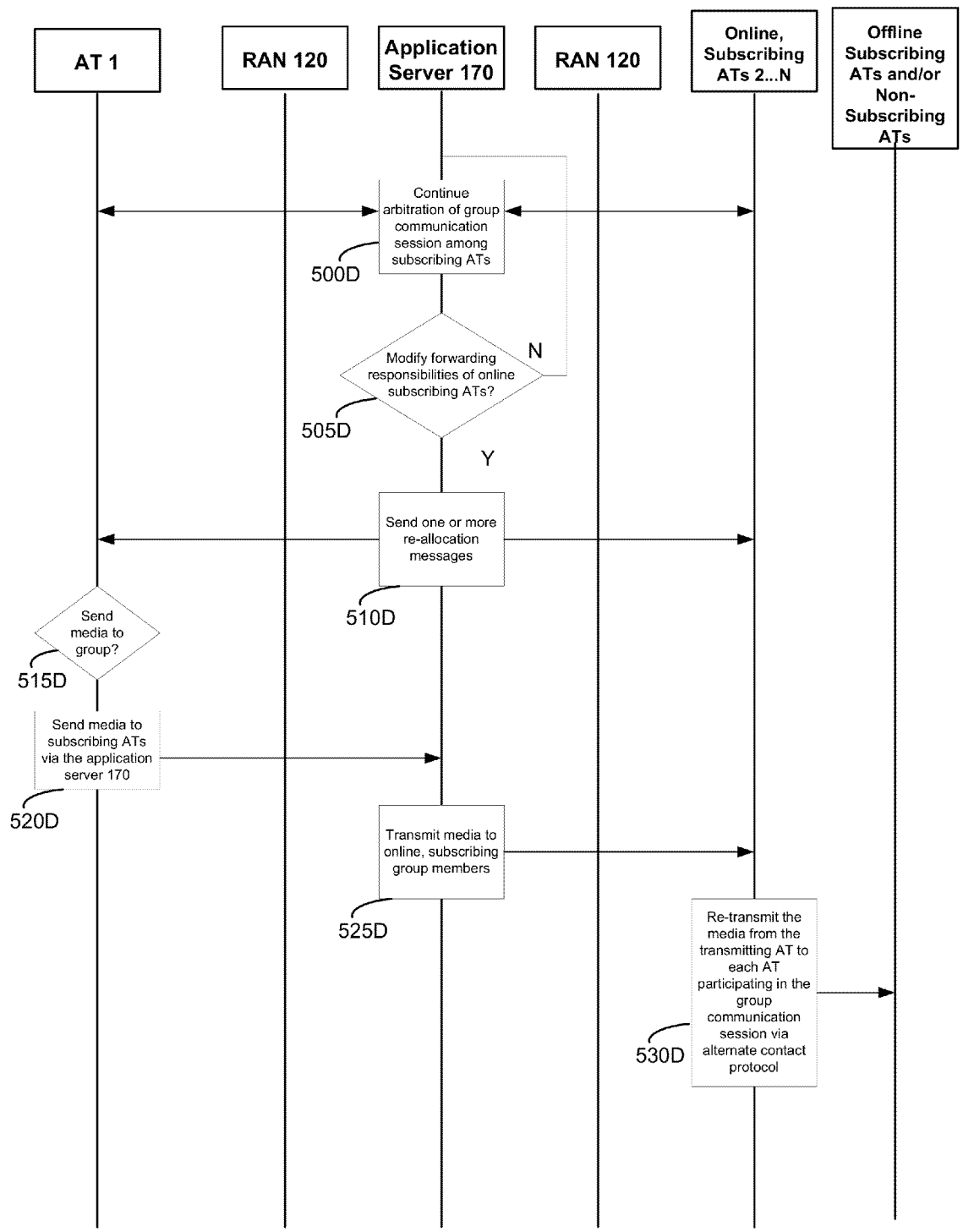
FIG. 5D illustrates a manner by which forwarding responsibilities can be re-allocated or re-distributed during a group communication session during the process of FIGS. 5A, 5B and/or 5C in accordance to an embodiment of the invention.

In FIGS. 5A through 5C, it will be appreciated that the session originator, or AT 1, is described as being responsible for forwarding messages between the offline subscribing ATs and/or non-subscribing ATs via the alternate contact protocol(s) and the online subscribing ATs via the primary communication protocol. However, in at least one embodiment, the forwarding responsibilities described above as belonging to AT 1 can be re-allocated, partially or completely, to one or more other online subscribing ATs once they join the group session. FIG. 5D illustrates one particular manner of re-allocating forwarding responsibilities during an active group communication session in accordance with at least one embodiment of the invention.

Referring to FIG. 5D, assume that the process of FIGS. 5A, 5B and/or 5C is executing, such that the application server 170 is arbitrating group messaging among two or more online subscribing ATs (i.e., AT 1 and at least one of ATs 2 . . . N), 500D. Next, the application server 170 determines whether to modify the allocation of online subscribing ATs that are responsible for supporting non-subscribing ATs and/or offline subscribing ATs. For example, assuming that AT 1 is the sole AT responsible for forwarding media to/from any offline subscribing ATs or non-subscribing ATs at this point in the group session, the application server 170 may determine to modify the forwarding responsibility allocation based on a message from AT 1 that indicates AT 1 is overloaded and cannot handle more ATs via alternate contact protocols. Alternatively, if the alternate contact protocol corresponds to SMS messaging, then the application server 170 can include a record of which subscribing ATs have unlimited SMS message plans, and can attempt to re-allocate the forwarding responsibilities among online subscribing ATs with unlimited SMS message plans. In another alternative embodiment, the application server 170 can simply attempt to ensure that the offline subscribing ATs and/or non-subscribing ATs in the group session are evenly distributed among the online subscribing ATs participating in the session. As will be appreciated, this may necessitate sending a list (e.g., by AT 1, initially), to the application server 170, of the offline subscribing ATs and/or non-subscribing ATs that are currently being supported. In an example, the application server 170 can attempt to maintain a number of ATs being supported by any one particular online subscribing AT to be less than a given threshold number (e.g., 5, 4, etc.).

Accordingly, if the application server 170 determines not to modify the forwarding responsibility allocation among the online subscribing ATs in 505D, the process returns to 500D. Otherwise, if the application server 170 determines to modify the forwarding responsibility allocation among the online subscribing ATs in 505D, the application server 170 sends one or more proprietary re-allocation message to AT 1 (e.g., to inform AT 1 that AT 1 can drop forward-message support of at least one of its currently supported ATs) and also sends one or more proprietary re-allocation message to one or more of ATs 2 . . . N (e.g., to inform at least one of ATs 2 . . . N to start forwarding messages to/from one of the non-subscribing ATs and/or one of the offline subscribing ATs via an alternate contact protocol). As will be appreciated, an allocation message instructing an AT to support a forwarding between a new AT will also be sent the alternate contact information (e.g., phone number) for the new AT for supporting the alternate contact protocol (e.g., SMS messaging) to/from the new AT.

In FIG. 5D, assume that the allocation messages of 510D function to de-allocate all forwarding responsibilities from AT 1 and to re-allocate all of AT 1's forwarding responsibilities to AT 2. In this case, when a user of AT 1 determines to send media to the group in 515D, AT 1 sends media to the RAN 120, which forwards the media to the application server 170 via the primary communication protocol, 520D. The application server 170 then transmits the media to the online subscribing ATs 2 . . . N, 525D, via the primary communication protocol. AT 2 receives this media and re-transmits the media via the alternate contact protocol(s) to each non-subscribing AT and/or offline subscribing AT participating in the group session, 530D (e.g., which previously would have been handled by AT 1). While FIG. 5D happens to illustrate a complete re-allocation of forwarding responsibilities from AT 1 to AT 2, it will be appreciated that other embodiments can re-allocate less than all of the ATs being supported by AT 1 to other ATs. Also, it will be appreciated that other embodiments can distribute forwarding responsibilities among more than two online subscribing ATs.

Above, FIGS. 5A through 5D are described such that the originating AT ("AT 1") designates the actual targets for the group communication session. In at least one embodiment, however, one or more target ATs of the group can bring in another AT into the group and can support the new AT(s) by forwarding messaging between the new AT(s) via an appropriate alternate contact protocol. Thus, while not shown explicitly above, the session originator need not be in total control of the ATs that eventually join the session in at least one embodiment, and the session can be extended to other targets for alternate contact protocols. For example, assume that AT 2 is an online subscribing AT that joins the session initiated by AT 1. AT 2 wants AT X to join the session, and AT X is neither a subscribing AT nor a non-subscribing AT being supported by AT 1. In this case, AT 2 can forward messages to/from AT X without explicit permission or authorization from AT 1, in at least one embodiment.

Figure 5E:
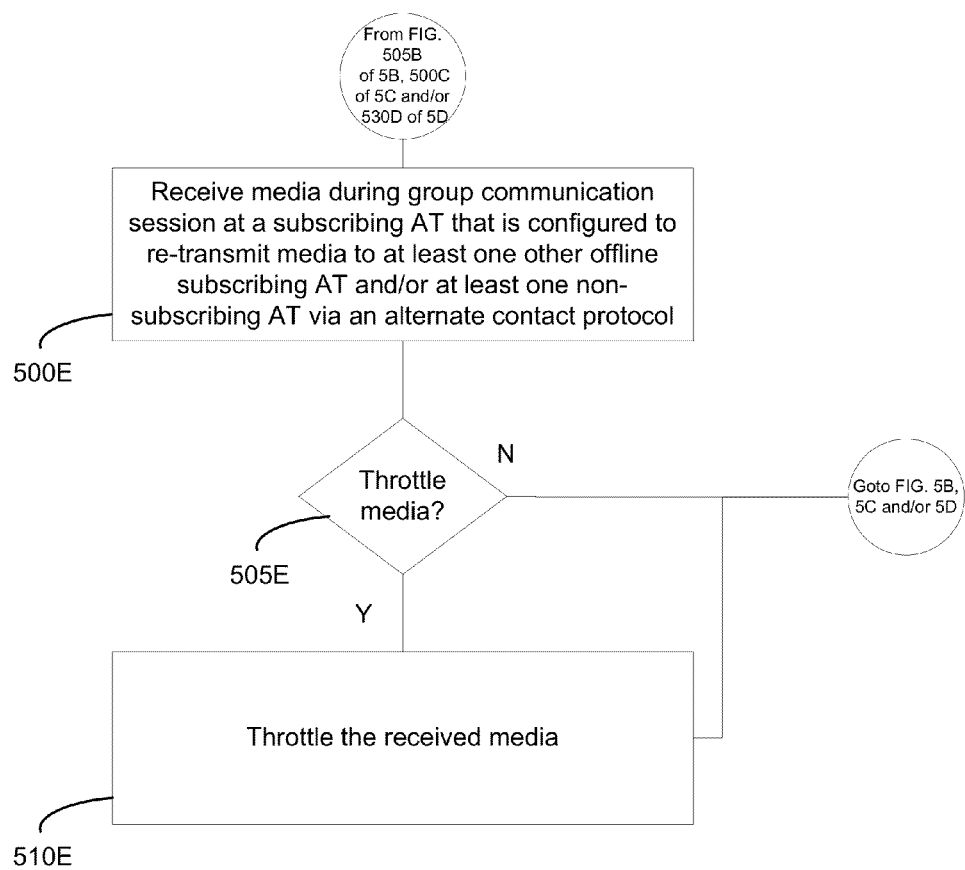
FIG. 5E illustrates a manner by which media forwarding between one or more ATs participating via an alternate contact protocol can be throttled during a group communication session during the process of FIGS. 5B, 5C and/or 5D in accordance to an embodiment of the invention.

Also, FIGS. 5A through 5D are described such that any media transmitted to the group via the primary communication protocol is re-transmitted, by one or more online subscribing ATs, to each non-subscribing AT and/or to each offline subscribing AT via the appropriate alternate contact protocol. In FIG. 5E, an optional 'throttling' implementation is discussed, by which the media re-transmissions over the alternate contact protocol can be selectively throttled (e.g., delayed, ignored, truncated, etc.) to reduce processing overhead at the re-transmitting AT and/or system load.

Accordingly, in any of FIGS. 5B through 5D, assume that an online subscribing AT either (i) receives media via the primary communication protocol that is to be transmitted to one or more non-subscribing ATs and/or offline subscribing ATs via associated alternate contact protocol(s), or (ii) receives media via an alternate contact protocol from one non-subscribing AT and/or offline subscribing AT that is to be transmitted to at least one other non-subscribing AT and/or offline subscribing AT via alternate contact protocol(s), 500E. Next, the online subscribing AT determines whether to throttle the received media, 505E. For example, the online subscribing AT can determine to throttle the media due to processing overload, system interference, if the AT sending the media to be re-transmitted is sending too much media (e.g., more than 5 SMS messages in a minute, etc.), etc.

If the online subscribing AT determines not to throttle the media in 505E, the process returns to 515B of FIG. 5B, 520C of FIG. 5C or 530D of FIG. 5D, and the media is re-transmitted via the alternate contact protocol(s). Otherwise, if the online subscribing AT determines to throttle the media in 505E, then the media is throttled in 510E. In an example, throttling the media may correspond to reducing the rate at which the online subscribing AT re-transmits the media (i.e., delaying the re-transmission of at least some of the media). In another example, throttling the media may correspond to eliminating some, but not all, of the data portion of the media and re-transmitting a reduced data packet that omits part of the media. In an example, throttling the media may correspond to dropping the media and performing no re-transmission function of the media. In another example, throttling the media may correspond to delaying one or more packets bound for the same destination AT(s) and then bundled multiple packets together to reduce the total number of messaging to/from the destination AT(s). After throttling the media, the process returns back to FIGS. 5B, 5C and/or 5D, and the throttled media is then either selectively re-transmitted (or is not re-transmitted) in the throttled or reduced manner.

Figure 5F:
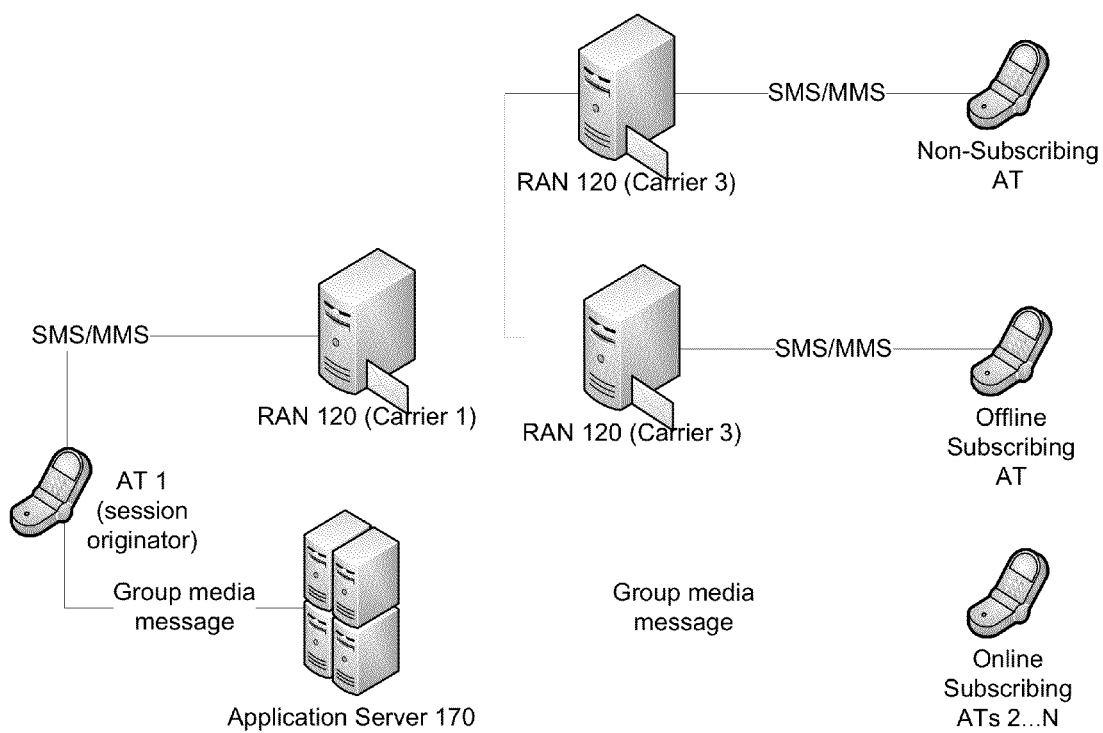
FIG. 5F illustrates a system that can support any of the processes of FIGS. 5A through 5E and/or FIGS. 6A through 7E in accordance to an embodiment of the invention.

FIG. 5F illustrates a system that can support any of the processes described above with respect to FIGS. 5A through 5E, as will as FIGS. 6A through 7E described below. Accordingly, AT 1 (i.e., the session originator), the online subscribing ATs 2 . . . N, a non-subscribing AT and an offline subscribing AT are each illustrated as mobile phones in this example. AT 1 is shown as connected to a first carrier ("Carrier 1") of the RAN 120 via a wireless connection that can at least carry SMS and/or MMS messages. Carrier 1 of the RAN 120 is in communication with second and third carriers ("Carrier 2" and "Carrier 3", respectively) of the RAN 120, each of which can receive or transmit SMS and/or MMS messages to the non-subscribing AT and/or the offline subscribing AT, respectively. AT 1 can also is shown as connected to the application server 170 (e.g., which may actually be connected through Carrier 1 of the RAN 120), through which at least group media messages in accordance with the primary communication protocol can be received or transmitted, and the online subscribing ATs are likewise configured to exchange group media messages in accordance with the primary communication protocol with the application server 170.

Figure 6A:
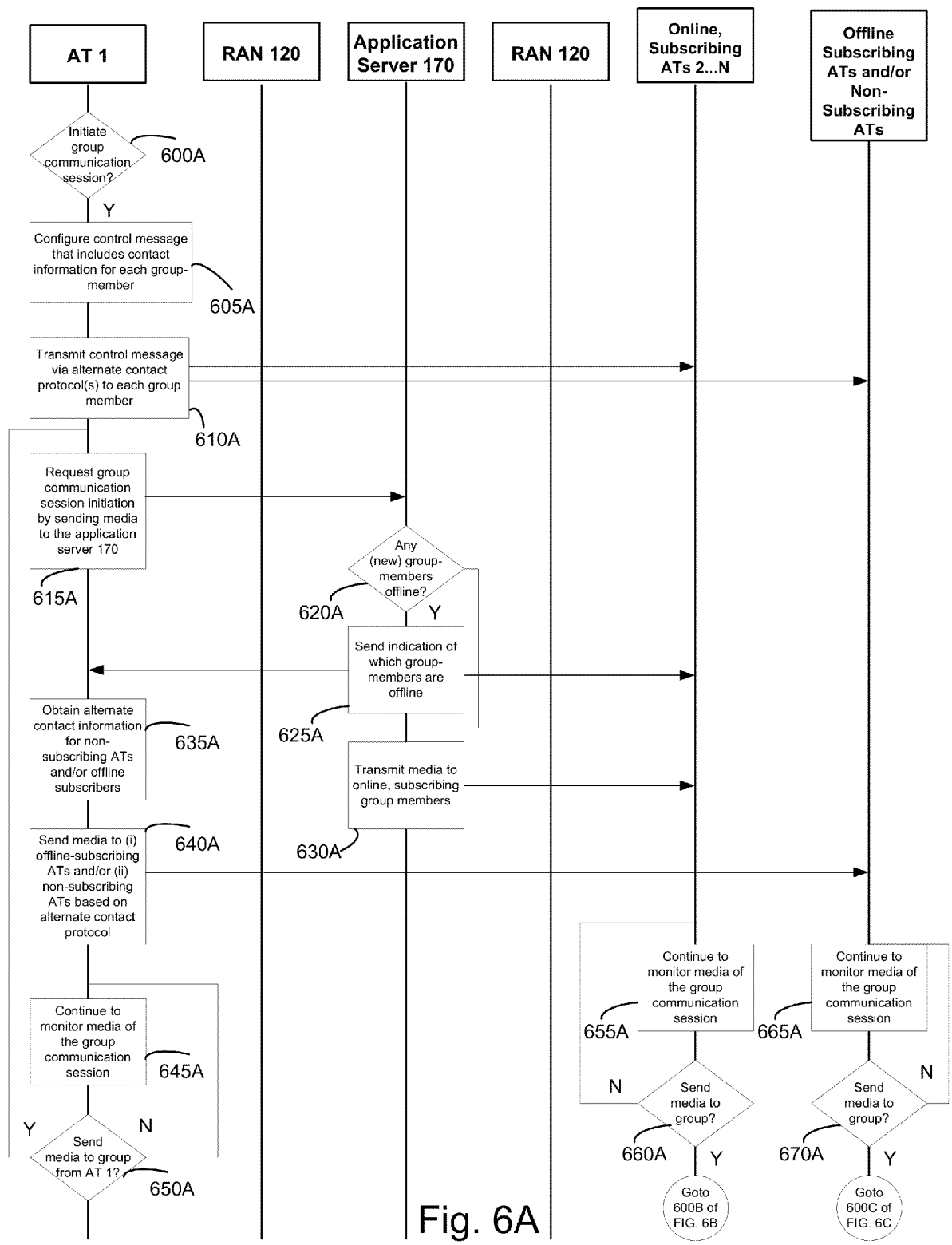
FIG. 6A illustrates a process of setting up a server-arbitrated group communication session initiated by an originating AT in accordance to another embodiment of the invention.

FIG. 6A illustrates a process of setting up a server-arbitrated group communication session initiated by an originating AT ("AT 1") in accordance to another embodiment of the invention. Referring to FIG. 6A, AT 1 determines whether to initiate a group communication session, 600A. Assume that AT 1 determines to initiate a group communication session to be at least partially arbitrated by the application server 170, that the user of AT 1 is an online subscriber to the service (i.e., the user of AT 1 has sufficient privileges to initiate the session) and that the user of AT 1 desires to contact a group of ATs that includes online subscribers, offline subscribing ATs and non-subscribing ATs. It may further be assumed that AT 1, each other online subscribing AT ("ATs 2 . . . N"), each non-subscribing AT and each offline subscribing AT has alternate contact information (e.g., a phone number, an email address, etc.) through which each respective AT can receive and/or transmit media via an alternate contact protocol (e.g., SMS message, MMS messaging, etc.).

In 605A, instead of simply sending the media to the group via the primary communication protocol and alternate contact protocol(s) as in FIG. 5A, AT 1 configures a control message that includes alternate contact information for each group-member, including all subscribing ATs for the group (e.g., both offline and online) as well as for each non-subscribing AT that AT 1 is trying to communicate with. This assumes that AT 1 either already has the alternate contact information for the group-members (e.g., in an address book or contact list), or else obtains the alternate contact information (e.g., from a network storage entity, from user input).

In 610A, AT 1 sends the control message via alternate contact protocol(s) (e.g., SMS messaging, MMS messaging, email, etc.) to each group member AT 1 is trying to reach, inclusive of subscribing ATs belonging to the group, as well as non-subscribing ATs belonging to the group. After sending the control message in 610A, 615A through 670A generally correspond to 505A through 560A of FIG. 5A, with the following exceptions. In 625A of FIG. 6A, unlike 515A of FIG. 5A, the application server 170 sends the indication of which group-members are currently offline each online subscribing AT, and not merely AT 1. As noted above with respect to 515A, the online subscribing ATs may be provisioned with a 'presence' feature through which the respective ATs can keep themselves informed of which other subscribing ATs are currently online. In this case, it will be appreciated that the decision block 620A and the notification of 625A need not be sent because the respective ATs can obtain information with regard to which subscribing ATs are offline via the presence feature. Also, the control message can contain a listing of a preferred contact protocol (e.g., the primary communication protocol or an alternate contact protocol), in which case the notification of 625A need not be performed and the online subscribing ATs can instead rely upon the listed preferred contact protocols, which for the offline subscribing ATs and non-subscribing ATs would be the alternate contact protocol. Also, in 635A, it may be assumed that the alternate contact information was already obtained when configuring the control message in 605A, such that 635A may correspond to a re-loading of this information at AT 1. Also, in the event of a determination to transmit data in blocks 650A, 660A and 670A, respectively, the process advances 615A, 600B of FIG. 6B and 600C of FIG. 6C, respectively.

Figure 6B:
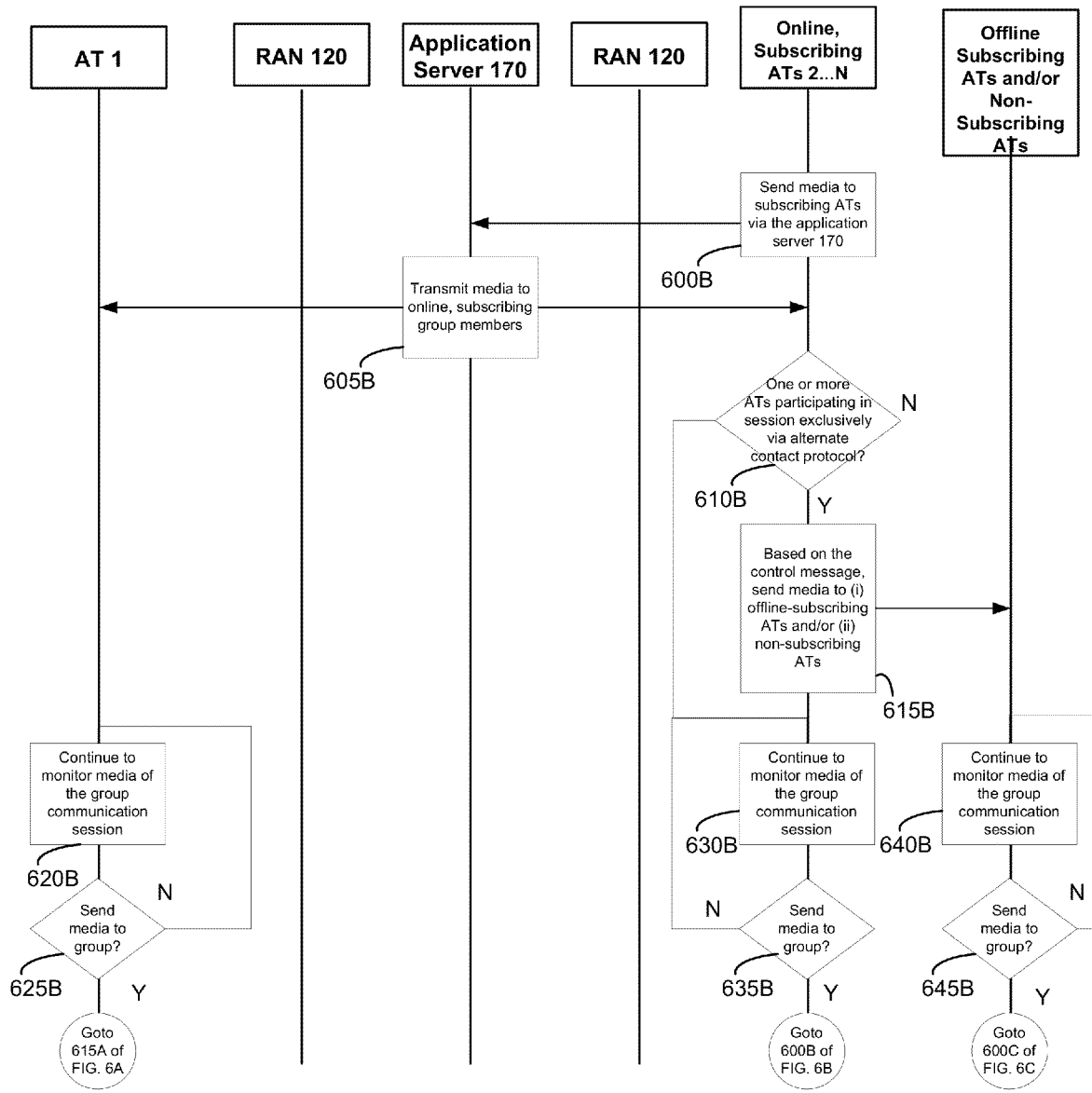
FIG. 6B illustrates a continuation of the process of FIG. 6A in accordance to an embodiment of the invention.

Referring to FIG. 6B, assume that one of the online subscribing ATs 2 . . . N has determined to send media to the group. Accordingly, the online subscribing AT sends media to the RAN 120, which is then forwarded to the application server 170, 600B, via the primary communication protocol. The application server 170 receives the media from the online subscribing AT, and then transmits the media to each other online subscribing AT, including AT 1, 605B, via the primary communication protocol. The online subscribing AT then determines whether one or more ATs are participating in the group communication session exclusively via one or more alternate contact protocols, and not the primary communication protocol, 610B. As will be appreciated, the determination of 605B is based on (i) the control message received at 605A of FIG. 6A and (ii) the indication of offline subscribing ATs received at 625A of FIG. 6A. In other words, if any offline subscribing ATs and/or non-subscribing ATs are included in the group, then at least one of the group participants is participating exclusively via an alternate contact protocol. If only online subscribing ATs are participating in the group communication session the process can advance directly to 630B. In this example, it may be assumed that at least one non-subscribing AT and/or offline subscribing AT is present in the group. Accordingly, the online subscribing AT transmits the media, which was also sent to the other online subscribing ATs in 600B via the primary communication protocol, to each non-subscribing AT and/or offline subscribing AT participating in the group communication session via their respective alternate contact protocol(s), 615B.

After transmitting the media via the respective alternate contact protocol(s) in 615B, 620B through 645B generally correspond to 645A through 670A of FIG. 6A, respectively, and as such will not be discussed further for the sake of brevity.

Figure 6C:
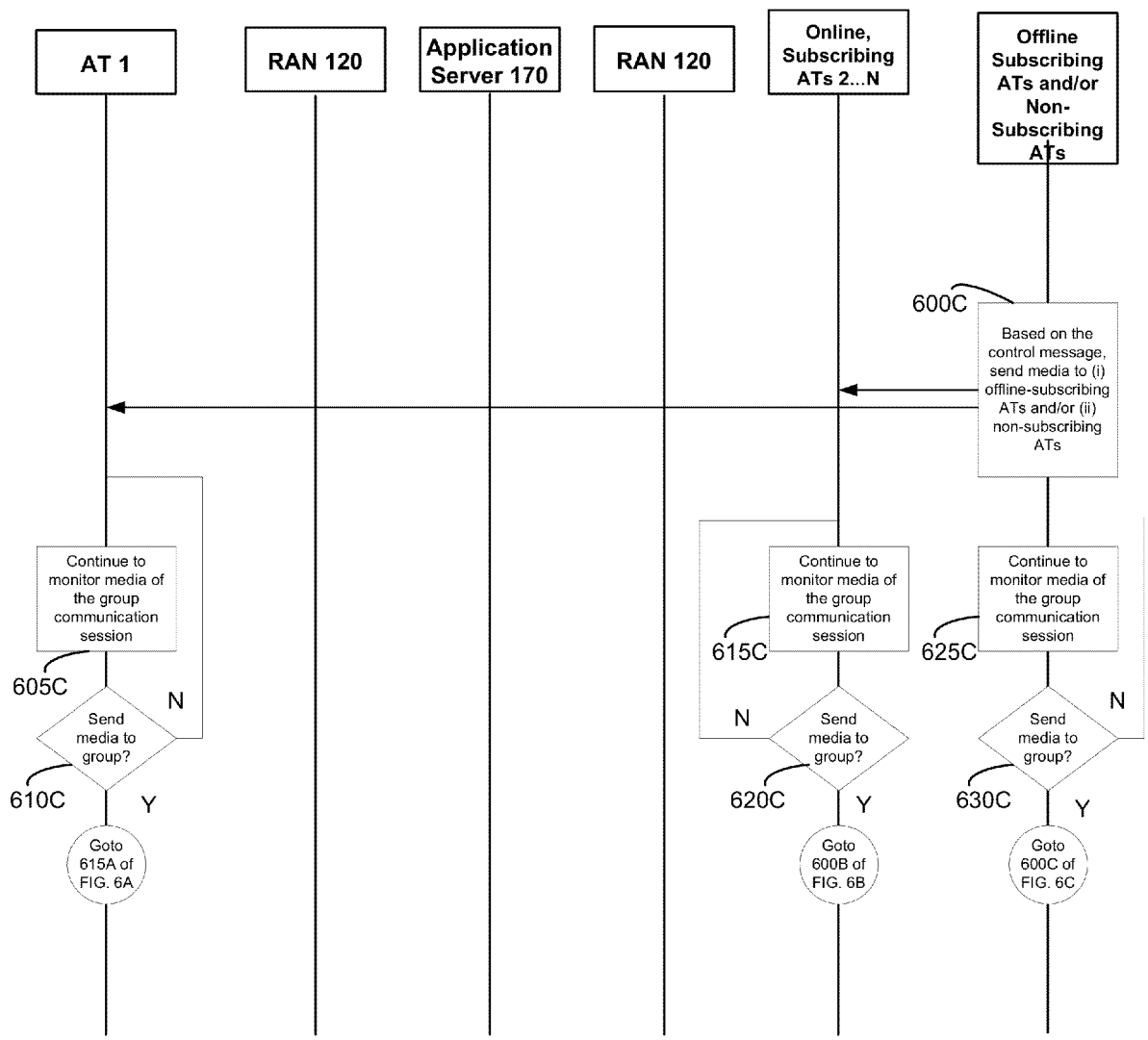
FIG. 6C illustrates a continuation of the process of FIG. 6A in accordance to an embodiment of the invention.

Referring to FIG. 6C, assume that one of the offline subscribing ATs and/or one of the non-subscribing ATs has determined to send media to the group. Accordingly, based on the control message, the offline subscribing AT or non-subscribing AT sends media to the RAN 120, which forwards the media to each AT listed in the control message via their respective alternate contact protocol(s), 600C. For example, if the alternate contact protocol is SMS messaging, then one or more SMS messages is sent to each other group member in 600C.

After transmitting the media via the respective alternate contact protocol(s) in 600C, 605C through 630C generally correspond to 645A through 670A of FIG. 6A, respectively, and as such will not be discussed further for the sake of brevity.

In the embodiments described above with respect to FIGS. 5A through 6C, the re-transmission of media from an intermediate AT to other destination ATs is described. In at least one embodiment, such re-transmissions can be configured to include some type of attribution tag, or code that functions to identify an original source of the message. For example, if AT 3 sends a message to AT 1 and AT 1 re-transmits this message to AT 2, AT 2 should be aware that AT 3 is the actual originator for this particular message, and not AT 1. Thus, AT 1 can add the tag indicating AT 3 as the source when re-transmitting the message. It will be readily appreciated by one of ordinary skill in the art with regard to how this concept can be applied to any re-transmission of media discussed above.

The embodiments described above with respect to FIGS. 5A through 6C have primarily been directed to handset-implementations of extending a communication group beyond ATs that are currently supporting a primary communication protocol associated with a server-arbitrated group communication session. However, as will now be described, it is also possible to configure the application server 170 itself to support online subscribing ATs via the primary communication protocol, while also provisioning the application server 170 with alternate contact information of the non-subscribing ATs and/or offline subscribing ATs such that the application server 170 can mediate the session with multiple protocols.

Figure 7A:
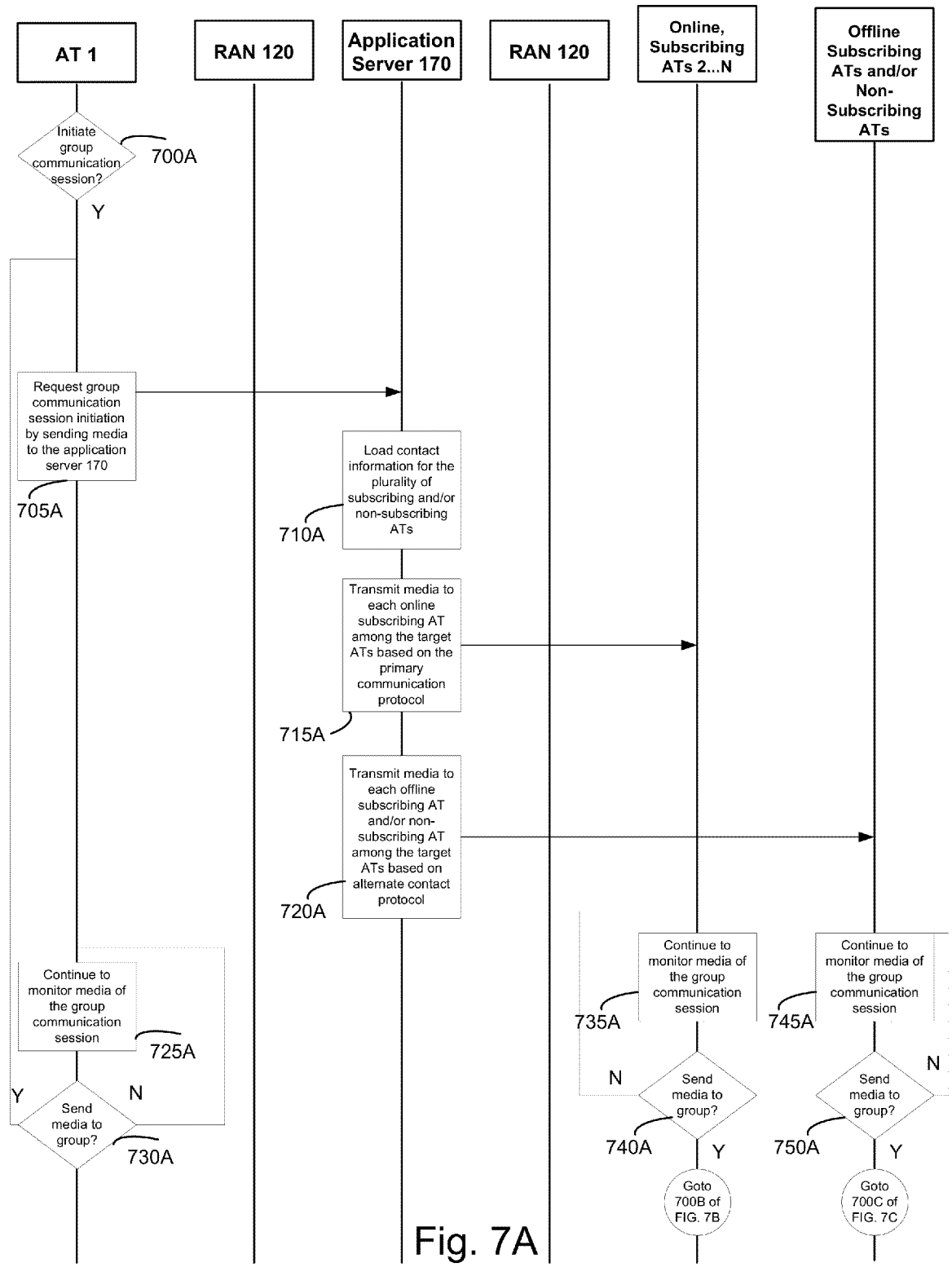
FIG. 7A illustrates a process of setting up a server-arbitrated group communication session initiated by an originating AT in accordance to another embodiment of the invention.

FIG. 7A illustrates a process of setting up a server-arbitrated group communication session initiated by an originating AT ("AT 1") in accordance to yet another embodiment of the invention. Referring to FIG. 7A, AT 1 determines whether to initiate a group communication session, 700A. Assume that AT 1 determines to initiate a group communication session to be arbitrated by the application server 170, that the user of AT 1 is an online subscriber to the service (i.e., the user of AT 1 has sufficient privileges to initiate the session) and that the user of AT 1 desires to contact a group of ATs that includes online subscribers, offline subscribing ATs and non-subscribing ATs. It may further be assumed that AT 1, each other online subscribing AT ("ATs 2 . . . N"), each non-subscribing AT and each offline subscribing AT has alternate contact information (e.g., a phone number, an email address, etc.) through which each respective AT can receive and/or transmit media via an alternate contact protocol (e.g., SMS message, MMS messaging, email, etc.).

Accordingly, in 705A, AT 1 sends a group communication session initiation request to the RAN 120, which is then forwarded to the application server 170. In an example, if the group communication session corresponds to a group-text and/or group multimedia session, the group communication session initiation request can be sent along with initial media (e.g., an initial text message, an initial multimedia message including video and/or audio, etc.) to be forwarded to the other group members. In 710A, the application server 170 receives the group communication session initiation request, and loads contact information for each subscribing AT and/or non-subscribing AT belonging to the associated group. In other words, in 510A of FIG. 5A, it is assumed that the application server 170 includes a subscriber-only group listing with associated group member information. However, in FIG. 7A, the application server 170 in FIG. 7A can maintain both subscriber contact information and non-subscriber contact information in association with the group. For example, in addition to having information with regard to how to contact online subscribing ATs (as is known in the art), the application server 170 is also provisioned with alternate contact information of all subscribing ATs (if available), as well as at least one non-subscribing AT.

Thus, similar to 510A of FIG. 5A, in 710A, the application server 170 locates the current online subscribers ("ATs 2 . . . N") belonging to the associated group, and determines if any of the group-members associated with the session request are offline, or not currently logged into the application server 170. Based on the application server's 170 determination of which ATs in the group are online subscribing ATs, the application server 170 transmits the media from AT 1 to the online subscribing ATs via the primary communication protocol, 715A, similar to 520A of FIG. 5A. However, unlike FIG. 5A, the application server 170 also transmits the media from AT 1 to the non-subscribing ATs and/or the offline subscribing ATs via their associated alternate contact information, 720A. In other words, the application server 170 need not rely on one or more of the online subscribing ATs to re-transmit the media using the alternate contact protocol, but rather can facilitate its own transmission of the media to the non-subscribing ATs and/or the offline subscribing via the alternate contact protocol(s), 720A. Thus, the application server 170 is capable of communicating via at least two protocols (e.g., the primary communication protocol and at least one alternate contact protocol).

Figure 7B:
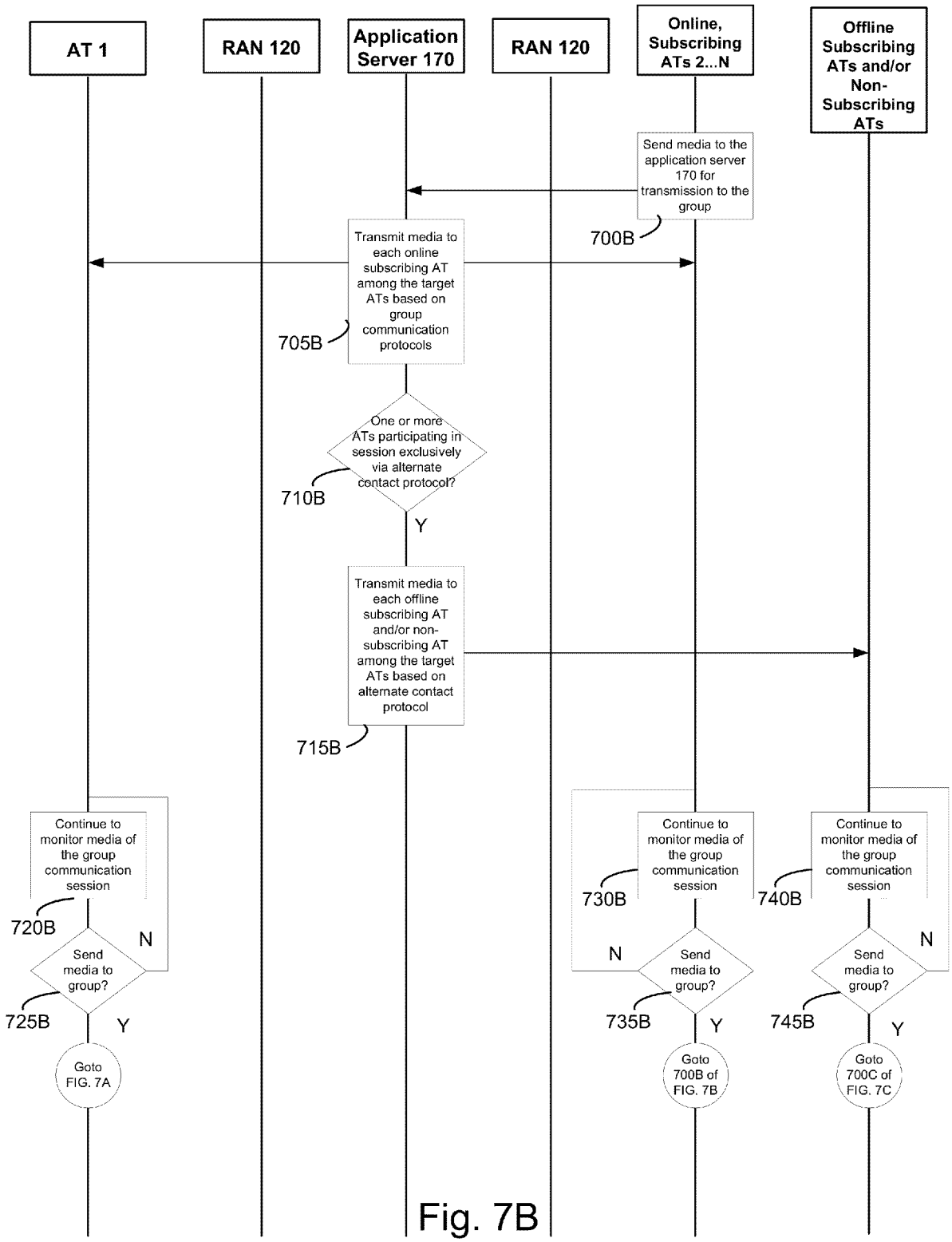
FIG. 7B illustrates a continuation of the process of FIG. 7A in accordance to an embodiment of the invention.
Figure 7C:
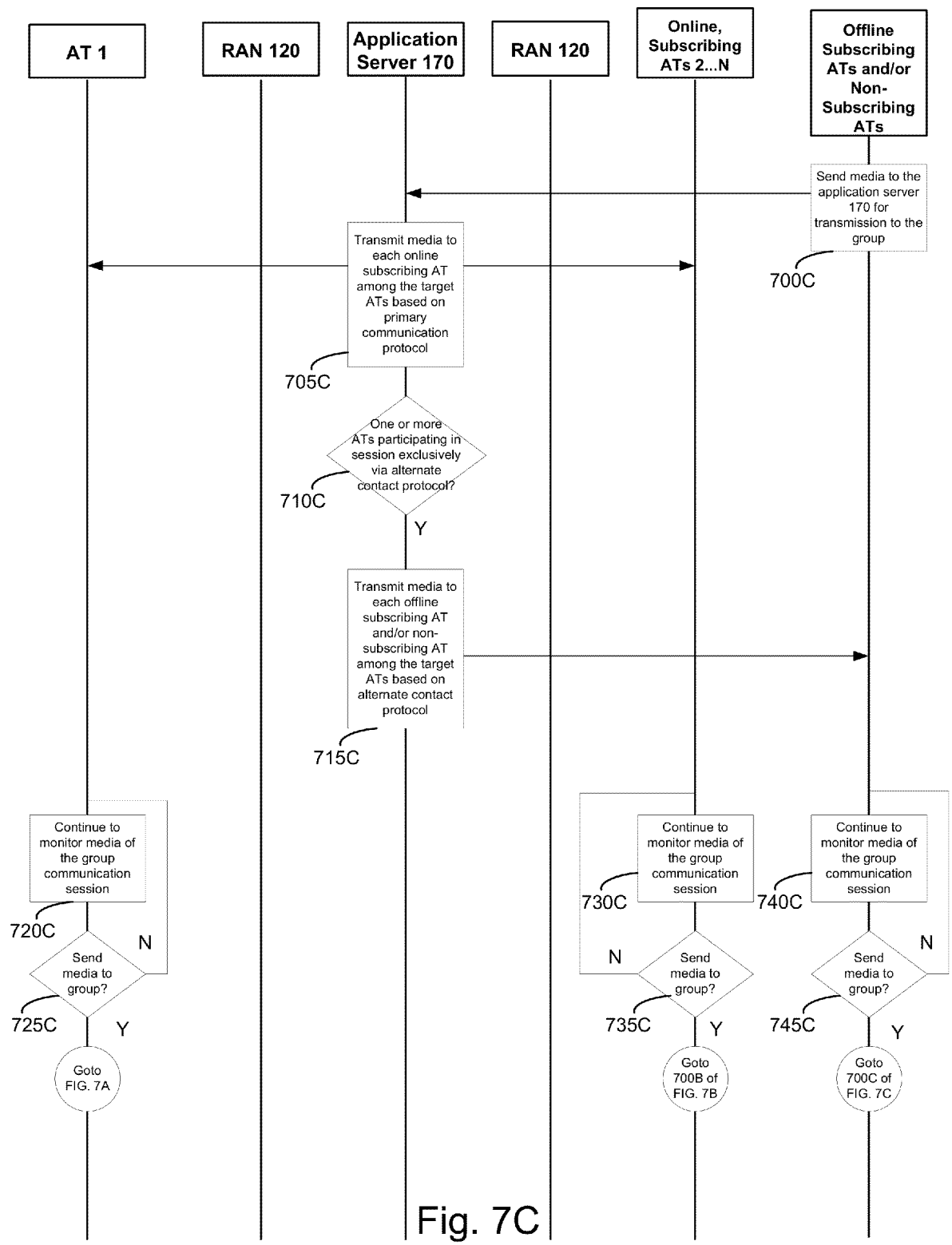
FIG. 7C illustrates a continuation of the process of FIG. 7A in accordance to an embodiment of the invention.

After sending the media to the non-subscribing ATs and/or the offline subscribing via the alternate contact protocol(s) in 720A, 725A through 750A generally correspond to 535A through 560A of FIG. 5A, with the following exception; namely, in the event of a determination to transmit data in blocks 730A, 740A and 750A, respectively, the process advances 705A, 700B of FIG. 7B and 700C of FIG. 7C, respectively.

Referring to FIG. 7B, assume that one of the online subscribing ATs 2 . . . N has determined to send media to the group. Accordingly, the online subscribing AT sends media to the RAN 120, which is then forwarded to the application server 170, 700B, via the primary communication protocol. The application server 170 receives the media from the online subscribing AT, and then transmits the media to each other online subscribing AT, including AT 1, 705B, via the primary communication protocol. The application server 170 then determines whether one or more ATs are participating in the group communication session exclusively via one or more alternate contact protocols, and not the primary communication protocol, 710B. In this example, it may be assumed that at least one non-subscribing AT and/or offline subscribing AT is present in the group. Accordingly, the application server 170 transmits the media via the alternate contact protocol to each non-subscribing AT and/or offline subscribing AT participating in the group communication session via their respective alternate contact protocol(s), 715B.

After transmitting the media via the respective alternate contact protocol(s) in 715B, 720B through 745B generally correspond to 725A through 750A of FIG. 7A, respectively, and as such will not be discussed further for the sake of brevity.

Referring to FIG. 7C, assume that one of the non-subscribing ATs and/or offline subscribing ATs has determined to send media to the group. Accordingly, the non-subscribing AT and/or offline subscribing AT sends media to the RAN 120, which is then forwarded to the application server 170, 700C, via the alternate contact protocol. For example, if the alternate contact protocol corresponds to email, 700C can be achieved by provisioning the application server 170 itself with an email address, which is then conveyed to the non-subscribing ATs and/or offline subscribing ATs in 720A along with the media. In another example, if the alternate contact protocol corresponds to SMS messaging, 700C can be achieved by provisioning the application server 170 itself with a phone number, which is then conveyed to the non-subscribing ATs and/or offline subscribing ATs in 720A along with the media.

The application server 170 receives the media from the non-subscribing AT and/or offline subscribing AT, and then transmits the media to each online subscribing AT, including AT 1, 705C, via the primary communication protocol. The application server 170 then determines whether one or more other ATs are participating in the group communication session exclusively via one or more alternate contact protocols, and not the primary communication protocol, 710C. In this example, it may be assumed that at least one non-subscribing AT and/or offline subscribing AT, other than the AT transmitting the media in 700C, is present in the group. Accordingly, the application server 170 transmits the media via the alternate contact protocol to each non-subscribing AT and/or offline subscribing AT, other than the AT transmitting the media in 700C, that is participating in the group communication session via their respective alternate contact protocol(s), 715C.

Figure 7D:
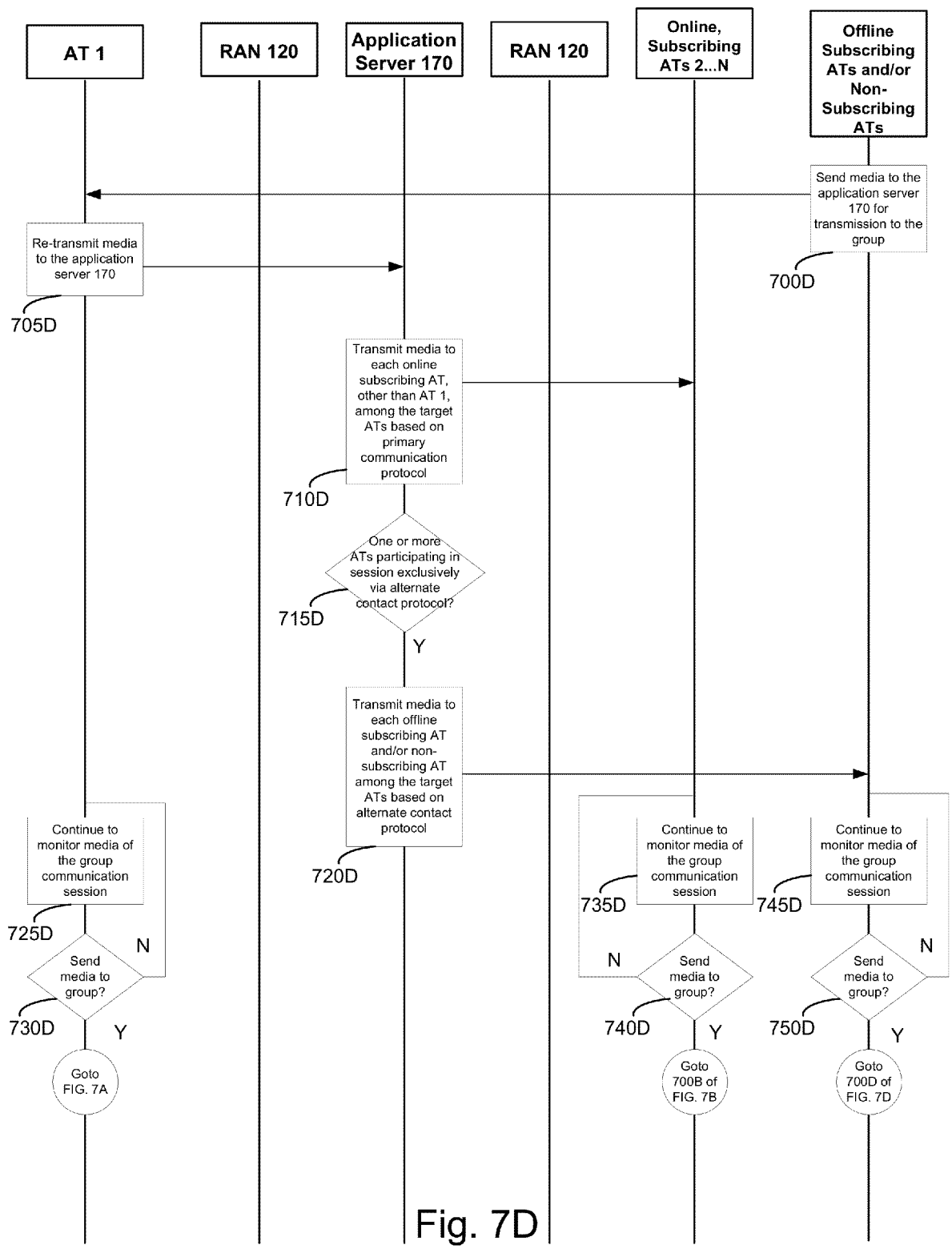
FIG. 7D illustrates an alternative continuation of the process of FIG. 7A in accordance to an embodiment of the invention.

FIG. 7D illustrates an alternative to the process of FIG. 7C. As in FIG. 7C, FIG. 7D shows how an offline subscribing AT and/or non-subscribing AT can send media to the group during the group communication session. However, in FIG. 7D, the offline subscribing AT and/or non-subscribing AT does not communicate with the application server 170 directly, but rather relays its media through one of the online-subscribing ATs. Accordingly, referring to FIG. 7D, assume that one of the non-subscribing ATs and/or offline subscribing ATs has determined to send media to the group. Accordingly, the non-subscribing AT and/or offline subscribing AT sends media to the RAN 120, which is then forwarded to AT 1, 700D, via the alternate contact protocol. In an example, if the session originator (i.e., AT 1) drops out of the session, the non-subscribing AT and/or offline subscribing AT can alternatively send the media in 700D to another online subscribing AT through an associated alternate contact protocol. For example, while not shown in FIG. 7D, the non-subscribing AT and/or offline subscribing AT can obtain the alternate contact protocol information for other online subscribing ATs from the session originator before the sessions originator drops the session (e.g., via a control message, not shown).

AT 1 receives the media and re-transmits the media to the application server 170, 705D. In an example, AT 1 can re-transmit the media in a manner such that the source of the transmission (e.g., the non-subscribing AT and/or offline subscribing AT) is somehow identified, such as via a tag or field of the media transmission in 705D.

The application server 170 receives the media from AT 1 and determines that the media originated the non-subscribing AT and/or offline subscribing AT, and then transmits the media to each online subscribing AT, other than AT 1, 710D, via the primary communication protocol (e.g., because AT 1 already received the media). The application server 170 then determines whether one or more other ATs (e.g., other than the source of the media transmission in 700D) are participating in the group communication session exclusively via one or more alternate contact protocols, and not the primary communication protocol, 715D. In this example, it may be assumed that at least one non-subscribing AT and/or offline subscribing AT, other than the AT transmitting the media in 700D, is present in the group. Accordingly, the application server 170 transmits the media via the alternate contact protocol to each non-subscribing AT and/or offline subscribing AT, other than the AT transmitting the media in 700D, that is participating in the group communication session via their respective alternate contact protocol(s), 720D.

After transmitting the media via the respective alternate contact protocol(s) in 720D, 725D through 750D generally correspond to 725A through 750A of FIG. 7A, respectively, and as such will not be discussed further for the sake of brevity.

After transmitting the media via the respective alternate contact protocol(s) in 715C, 720C through 745C generally correspond to 725A through 750A of FIG. 7A, respectively, and as such will not be discussed further for the sake of brevity.

Figure 7E:
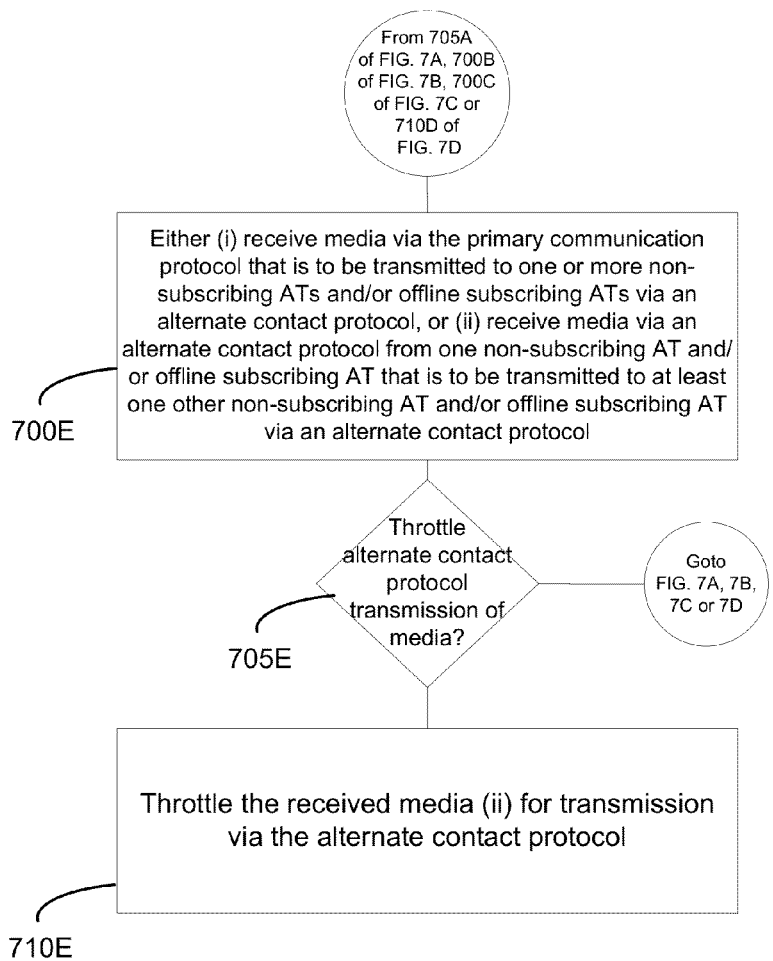
FIG. 7E illustrates a manner by which media forwarding between one or more ATs participating via an alternate contact protocol can be throttled during a group communication session during the process of FIGS. 7A, 7B and/or 7C in accordance to an embodiment of the invention.

In FIG. 7E, similar to FIG. 5E above with respect to a handset-based forwarding implementation, an optional 'throttling' implementation is discussed, by which the application server 170 can restrict or throttle transmissions (e.g., delay, ignore, truncate, etc.) over the alternate contact protocol to reduce processing overhead and/or system load or interference.

Accordingly, in any of FIGS. 7A through 7E, assume that the application server 170 either (i) receives media via the primary communication protocol that is to be transmitted to one or more non-subscribing ATs and/or offline subscribing ATs via an alternate contact protocol, or (ii) receives media via an alternate contact protocol from one non-subscribing AT and/or offline subscribing AT that is to be transmitted to at least one other non-subscribing AT and/or offline subscribing AT via an alternate contact protocol, 700E. Next, the application server 170 determines whether to throttle the received media, 705E. For example, the application server 170 can determine to throttle the media due to processing overload, system interference, if a frequency of alternate contact profile messages being sent from the application server 170 is too higher (e.g., more than 5 SMS messages in a minute, etc.), etc.

If the application server 170 determines not to throttle the media in 705E, the process returns to 720A of FIG. 7A, 715B of FIG. 7B, 715C of FIG. 7C or 720D of FIG. 7D, and the media is transmitted via the alternate contact protocol(s). Otherwise, if the application server 170 determines to throttle the media in 705E, then the media is throttled in 710E. In an example, throttling the media may correspond to reducing the rate at which the application server 170 transmits the media (i.e., delaying the transmission of at least some of the media). In another example, throttling the media may correspond to eliminating some, but not all, of the data portion of the media and transmitting a reduced data packet that omits part of the media. In an example, throttling the media may correspond to dropping the media and performing no transmission function of the media via the alternate contact protocol. In another example, throttling the media may correspond to delaying one or more packets bound for the same destination AT(s) and then bundled multiple packets together to reduce the total number of messaging to/from the destination AT(s). After throttling the media, the process returns back to FIGS. 7A, 7B, 7C and/or 7D, and the throttled media is then either selectively transmitted (or is not transmitted) in the throttled or reduced manner.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored as one or more instructions or code on a computer-readable medium. Computer-readable media includes computer storage media that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method, comprising:

obtaining media intended for transmission to a communication group during a group communication session that is at least partially arbitrated by an application server within a wireless communications system, the communication group including a first set of access terminals configured to exchange media via a primary communication protocol mediated by the application server and a second set of access terminals configured to exchange media via a secondary communication protocol, wherein each access terminal of the communication group is associated with a different group member;

receiving a status indication of one or more access terminals within the communication group during the group communication session;

determining the second set of access terminals based on the received status indication; and selectively transmitting the obtained media in accordance with the primary communication protocol to the first set of access terminals and the secondary communication protocol to the second set of access terminals to facilitate both the first and second sets of access terminals to receive the obtained media during the group communication session.

2. The method of claim 1,
wherein the obtaining and selectively transmitting steps are performed by an access terminal among the first set of access terminals,
wherein the obtained media originates from the access terminal,
and wherein the selectively transmitting step includes:
requesting the application server to transmit the obtained media to the first set of access terminals via the primary communication protocol; and
transmitting the obtained media to the second set of access terminals via the secondary communication protocol.

3. The method of claim 1,
wherein the obtaining and selectively transmitting steps are performed by an access terminal among the first set of access terminals,
wherein the obtained media originates from another access terminal among the first set of access terminals and arrives at the access terminal via the primary communication protocol,
and wherein the selectively transmitting step includes:
transmitting the obtained media to the second set of access terminals via the secondary communication protocol.

4. The method of claim 1,
wherein the obtaining and selectively transmitting steps are performed by an access terminal among the first set of access terminals,
wherein the obtained media originates from a given access terminal among the second set of access terminals and arrives at the access terminal via the secondary communication protocol,
and wherein the selectively transmitting step includes:
requesting, on behalf of the given access terminal, the application server to transmit the obtained media to the first set of access terminals via the primary communication protocol.

5. The method of claim 4, wherein the selectively transmitting step further includes:
transmitting the obtained media to each access terminal among the second set of access terminals except for the given access terminal via the secondary communication protocol.

6. The method of claim 1, wherein the obtaining and selectively transmitting steps are performed by an access terminal among the first set of access terminals, further comprising:
receiving an instruction from the application server to modify the manner in which the access terminal performs the selectively transmitting step.

7. The method of claim 6, wherein the received instruction adjusts the access terminal's responsibilities for directly exchanging media with the second set of access terminals during the group communication session via the secondary communication protocol.

8. The method of claim 7, wherein the received instruction increases a number of the second set of access terminals to be supported by the access terminal during the group communication session via the secondary communication protocol.

9. The method of claim 7, wherein the received instruction decreases a number of the second set of access terminals to be supported by the access terminal during the group communication session via the secondary communication protocol.

10. The method of claim 1, further comprising:
determining to throttle the obtained media; and
throttling the obtained media to generate a throttled version of the obtained media.

11. The method of claim 10, wherein the throttling step performs one or more of (i) reducing a rate at which the obtained media is transmitted by the selectively transmitting step, (ii) eliminating a portion of the obtained media such that the selectively transmitting step transmits less than all of the obtained media, (iii) delaying the transmission of the obtained media such that the selectively transmitting step does not immediately transmit the obtained media and/or (iv) dropping the obtained media such that the selectively transmitting step does not transmit the obtained media.

12. The method of claim 10, wherein the determination to throttle the obtained media is based on one or more of (i) processing load being above a load threshold, (ii) system interference being above an interference threshold (iii) and/or an amount of the obtained media being above an amount threshold.

13. The method of claim 1, further comprising:
acquiring contact information for each access terminal among the first and second sets of access terminals, the acquired contact information including secondary contact information for contacting the first and second sets of access terminals via the secondary communication protocol.

14. The method of claim 13, further comprising:
sending a control message including the acquired contact information to the first and second sets of access terminals using the associated secondary contact information via the secondary communication protocol.

15. The method of claim 13,
wherein the obtaining and selectively transmitting steps are performed by an access terminal,
and wherein the acquiring step includes receiving a control message including the acquired contact information at the access terminal based on the access terminal's secondary contact information via the secondary communication protocol.

16. The method of claim 13, wherein, based on the acquiring step, the selectively transmitting step is configured to use the primary communication protocol to send the obtained media to one or more of the first set of access terminals from the received indication and to use the secondary communication protocol to send the obtained media to one or more of the second set of access terminals.

17. The method of claim 13,
wherein the obtaining and selectively transmitting steps are performed by an access terminal among the second set of access terminals,
and wherein the selectively transmitting step is configured to use the secondary communication protocol to send the obtained media to the first and second sets of access terminals other than the access terminal.

18. The method of claim 1,
wherein the obtaining and selectively transmitting steps are performed by an access terminal among the second set of access terminals,
and wherein the selectively transmitting step includes:
configuring a message to request that a given access terminal among the first set of access terminals retransmit the obtained media to the first set of access terminals via the primary communication protocol; and
transmitting the configured message, including the obtained media, to the given access terminal.

19. The method of claim 1, wherein the primary communication protocol is a specifically configured to support server-arbitrated group communication sessions between access terminals.

20. The method of claim 1, wherein the secondary communication protocol includes one or more of (i) a simple message service (SMS) or texting protocol, (ii) a multimedia message service (MMS) protocol and/or (iii) an e-mail protocol.

21. A method, comprising:
exchanging media between a first set of access terminals of a communication group with a primary communication protocol during a group communication session via an application server within a wireless communications system, wherein each access terminal of the communication group is associated with a different group member;
generating a status indication of one or more access terminals within the communication group during the group communication session;
determining a second set of access terminals based on the generated status indication; and
sending, during the group communication session, an instruction from the application server to a given access terminal among the first set of access terminals, the instruction associated with whether the given access terminal is responsible for extending support of the group communication session to at least one of a second set of access terminals via a secondary communication protocol.

22. The method of claim 21, wherein the instruction instructs the given access terminal to re-transmit, to the at least one access terminal of the second set of access terminals and via the secondary communication protocol, media that is sent from the application server to the given access terminal via the primary communication protocol during the group communication session.

23. The method of claim 21, wherein the instruction instructs the given access terminal to re-transmit, to the application server via the primary communication protocol, media that is sent from the at least one access terminal of the second set of access terminals to the given access terminal via the secondary communication protocol.

24. The method of claim 21, wherein the instruction instructs the give access terminal to stop re-transmitting, to the at least one access terminal of the second set of access terminals and via the secondary communication protocol, media that is sent from the application server to the given access terminal via the primary communication protocol during the group communication session.

25. The method of claim 21, wherein the instruction instructs the given access terminal to stop re-transmitting, to the application server via the primary communication protocol, media that is sent from the at least one access terminal of the second set of access terminals to the given access terminal via the secondary communication protocol.

26. The method of claim 21, wherein the primary communication protocol is a specifically configured to support server-arbitrated group communication sessions between access terminals.

27. The method of claim 21, wherein the secondary communication protocol includes one or more of (i) a simple message service (SMS) or texting protocol, (ii) a multimedia message service (MMS) protocol and/or (iii) an e-mail protocol.

28. A method, comprising:
receiving in an application server within a wireless communications system, from a given access terminal among a communication group, media that is intended for transmission to the communication group during a group communication session, wherein each access terminal of the communication group is associated with a different group member;
determining in the application server, from among the communication group, a first set of access terminals configured to exchange media via a primary communication protocol;
generating a status indication of one or more access terminals within the communication group during the group communication session;
determining in the application server, from among the communication group, a second set of access terminals configured to exchange media via a secondary communication protocol based on the generated status indication;
acquiring secondary contact information by which each access terminal among the second set of access terminals can be contacted via the secondary communication protocol;
selectively transmitting the received media to the first set of access terminals via the primary communication protocol during the group communication session; and
selectively transmitting the received media to the second set of access terminals via the secondary communication protocol during the group communication session.

29. The method of claim 28,
wherein the given access terminal is included among the first set of access terminals, and wherein the given access terminal communicates the received media to the application server via the primary communication protocol.

30. The method of claim 29, wherein the given access terminal is an originator of the group communication session.

31. The method of claim 29, wherein the given access terminal is not an originator of the group communication session.

32. The method of claim 29, wherein the received media corresponds to a retransmission of media from the given access terminal that was previously forwarded to the given access terminal from another access terminal among the second set of access terminals over the secondary communication protocol.

33. The method of claim 28,
wherein the given access terminal is included among the second set of access terminals, and wherein the given access terminal communicates the received media to the application server via the secondary communication protocol.

34. The method of claim 28, further comprising:
determining to throttle the received media for transmission to the second set of access terminals via the secondary communication protocol; and
throttling the received media to generate a throttled version of the received media.

35. The method of claim 34, wherein the throttling step performs one or more of (i) reducing a rate at which the received media is transmitted by the selectively transmitting the received media to the second set of access terminals step, (ii) eliminating a portion of the received media such that the selectively transmitting the received media to the second set of access terminals step transmits less than all of the received media, (iii) delaying the transmission of the received media such that the selectively transmitting the received media to the second set of access terminals step does not immediately transmit the received media and/or (iv) dropping the received media such that the selectively transmitting step does not transmit the received media to the second set of access terminals step.

36. The method of claim 34, wherein the determination to throttle the obtained media is based on one or more of (i) processing load being above a load threshold, (ii) system interference being above an interference threshold (iii) and/or an amount of the received media being above an amount threshold.

37. The method of claim 28, wherein the primary communication protocol is a specifically configured to support server-arbitrated group communication sessions between access terminals.

38. The method of claim 28, wherein the secondary communication protocol includes one or more of (i) a simple message service (SMS) or texting protocol, (ii) a multimedia message service (MMS) protocol and/or (iii) an e-mail protocol.

39. An access terminal, comprising:
means for obtaining media intended for transmission to a communication group during a group communication session that is at least partially arbitrated by an application server within a wireless communications system, the communication group including a first set of access terminals configured to exchange media via a primary communication protocol mediated by the application server and a second set of access terminals configured to exchange media via a secondary communication protocol, wherein each access terminal of the communication group is associated with a different group member;
means for receiving a status indication of one or more access terminals within the communication group during the group communication session;
means for determining the second set of access terminals based on the received status indication; and
means for selectively transmitting the obtained media in accordance with the primary communication protocol to the first set of access terminals and the secondary communication protocol to the second set of access terminals to facilitate both the first and second sets of access terminals to receive the obtained media during the group communication session.

40. An application server within a wireless communications system, comprising:
means for exchanging media between a first set of access terminals of a communication group with a primary communication protocol during a group communication session, wherein each access terminal of the communication group is associated with a different group member;
means for generating a status indication of one or more access terminals within the communication group during the group communication session;
means for determining a second set of access terminals based on the generated status indication; and
means for sending, during the group communication session, an instruction to a given access terminal among the first set of access terminals, the instruction associated with whether the given access terminal is responsible for extending support of the group communication session to at least one of a second set of access terminals via a secondary communication protocol.

41. An application server within a wireless communications system, comprising:
means for receiving, from a given access terminal among a communication group, media that is intended for transmission to a communication group during the group communication session, wherein each access terminal of the communication group is associated with a different group member;
means for determining, from among the communication group, a first set of access terminals configured to exchange media via a primary communication protocol;
means for generating a status indication of one or more access terminals within the communication group during the group communication session;
means for determining, from among the communication group, a second set of access terminals configured to exchange media via a secondary communication protocol based on the generated status indication;
means for acquiring secondary contact information by which each access terminal among the second set of access terminals can be contacted via the secondary communication protocol;
means for selectively transmitting the received media to the first set of access terminals via the primary communication protocol during the group communication session; and
means for selectively transmitting the received media to the second set of access terminals via the secondary communication protocol during the group communication session.

42. An access terminal, comprising:
a processor configured with software instructions to perform operations comprising:
obtaining media intended for transmission to a communication group during a group communication session that is at least partially arbitrated by an application server within a wireless communications system, the communication group including a first set of access terminals configured to exchange media via a primary communication protocol mediated by the application server and a second set of access terminals configured to exchange media via a secondary communication protocol, wherein each access terminal of the communication group is associated with a different group member;
receiving a status indication of one or more access terminals within the communication group during the group communication session;
determining the second set of access terminals based on the received status indication; and
selectively transmitting the obtained media in accordance with the primary communication protocol to the first set of access terminals and the secondary communication protocol to the second set of access terminals to facilitate both the first and second sets of access terminals to receive the obtained media during the group communication session.

43. An application server within a wireless communications system, comprising:
a processor configured with software instructions to perform operations comprising:
exchanging media between a first set of access terminals of a communication group with a primary communication protocol during a group communication session, wherein each access terminal of the communication group is associated with a different group member;

generating a status indication of one or more access terminals within the communication group during the group communication session;

determining a second set of access terminals based on the generated status indication; and sending, during the group communication session, an instruction to a given access terminal among the first set of access terminals, the instruction associated with whether the given access terminal is responsible for extending support of the group communication session to at least one of a second set of access terminals via a secondary communication protocol.

44. An application server within a wireless communications system, comprising:

a processor configured with software instructions to perform the operations comprising:

receiving, from a given access terminal among a communication group, media that is intended for transmission to the communication group during a group communication session, wherein each access terminal of the communication group is associated with a different group member;

determining, from among the communication group, a first set of access terminals configured to exchange media via a primary communication protocol;

generating a status indication of one or more access terminals within the communication group during the group communication session;

determining a second set of access terminals, from among the communication group, configured to exchange media via a secondary communication protocol based on the generated status indication;

acquiring secondary contact information by which each access terminal among the second set of access terminals can be contacted via the secondary communication protocol;

selectively transmitting the received media to the first set of access terminals via the primary communication protocol during the group communication session; and selectively transmitting the received media to the second set of access terminals via the secondary communication protocol during the group communication session.

45. A non-transitory computer-readable storage medium containing instructions stored thereon, which, when executed by an access terminal, cause the access terminal to perform operations comprising:

obtaining media intended for transmission to a communication group during a group communication session that is at least partially arbitrated by an application server within a wireless communications system, the communication group including a first set of access terminals configured to exchange media via a primary communication protocol mediated by the application server and a second set of access terminals configured to exchange media via a secondary communication protocol, wherein each access terminal of the communication group is associated with a different group member;

receiving a status indication of one or more access terminals within the communication group during the group communication session;

determining the second set of access terminals based on the received status indication; and selectively transmitting the obtained media in accordance with the primary communication protocol to the first set of access terminals and the secondary communication protocol to the second set of access terminals to facilitate both the first and second sets of access terminals to receive the obtained media during the group communication session.

46. A non-transitory computer-readable storage medium containing instructions stored thereon, which, when executed by an application server within a wireless communications system, cause the application server to perform operations comprising:

exchanging media between a first set of access terminals of a communication group with a primary communication protocol during a group communication session, wherein each access terminal of the communication group is associated with a different group member;

generating a status indication of one or more access terminals within the communication group during the group communication session;

determining a second set of access terminals based on the generated status indication; and sending, during the group communication session, an instruction to a given access terminal among the first set of access terminals, the instruction associated with whether the given access terminal is responsible for extending support of the group communication session to at least one of a second set of access terminals via a secondary communication protocol.

47. A non-transitory computer-readable storage medium containing instructions stored thereon, which, when executed by an application server within a wireless communications system, cause the application server to perform operations comprising:

receiving, from a given access terminal among a communication group, media that is intended for transmission to the communication group during a group communication session, wherein each access terminal of the communication group is associated with a different group member;

determining, from among the communication group, a first set of access terminals configured to exchange media via a primary communication protocol;

generating a status indication of one or more access terminals within the communication group during the group communication session;

determining, from among the communication group, a second set of access terminals configured to exchange media via a secondary communication protocol based on the generated status indication;

acquiring secondary contact information by which each access terminal among the second set of access terminals can be contacted via the secondary communication protocol;

selectively transmitting the received media to the first set of access terminals via the primary communication protocol during the group communication session; and selectively transmitting the received media to the second set of access terminals via the secondary communication protocol during the group communication session.

48. A method, comprising:

obtaining media intended for transmission to a communication group during a group communication session that is at least partially arbitrated by an application server within a wireless communications system, the communication group including a first set of access terminals configured to exchange media via a primary communication protocol mediated by the application server and a second set of access terminals configured to exchange media via a secondary communication protocol, wherein each access terminal of the communication group is associated with a different group member; and selectively transmitting the obtained media in accordance with the primary communication protocol to the first set of access terminals and the secondary communication protocol to the second set of access terminals to facilitate both the first and second sets of access terminals to receive the obtained media during the group communication session.

49. An access terminal, comprising:

means for obtaining media intended for transmission to a communication group during a group communication session that is at least partially arbitrated by an application server within a wireless communications system, the communication group including a first set of access terminals configured to exchange media via a primary communication protocol mediated by the application server and a second set of access terminals configured to exchange media via a secondary communication protocol, wherein each access terminal of the communication group is associated with a different group member; and means for selectively transmitting the obtained media in accordance with the primary communication protocol to the first set of access terminals and the secondary communication protocol to the second set of access terminals to facilitate both the first and second sets of access terminals to receive the obtained media during the group communication session.

50. An access terminal, comprising:

a processor configured with software instructions to perform operations comprising:

obtaining media intended for transmission to a communication group during a group communication session that is at least partially arbitrated by an application server within a wireless communications system, the communication group including a first set of access terminals configured to exchange media via a primary communication protocol mediated by the application server and a second set of access terminals configured to exchange media via a secondary communication protocol, wherein each access terminal of the communication group is associated with a different group member; and selectively transmitting the obtained media in accordance with the primary communication protocol to the first set of access terminals and the secondary communication protocol to the second set of access terminals to facilitate both the first and second sets of access terminals to receive the obtained media during the group communication session.

51. A non-transitory computer-readable storage medium containing instructions stored thereon, which, when executed by an access terminal, cause the access terminal to perform operations comprising:

obtaining media intended for transmission to a communication group during a group communication session that is at least partially arbitrated by an application server within a wireless communications system, the communication group including a first set of access terminals configured to exchange media via a primary communication protocol mediated by the application server and a second set of access terminals configured to exchange media via a secondary communication protocol, wherein each access terminal of the communication group is associated with a different group member; and selectively transmitting the obtained media in accordance with the primary communication protocol to the first set of access terminals and the secondary communication protocol to the second set of access terminals to facilitate both the first and second sets of access terminals to receive the obtained media during the group communication session.

* * * * *